United States Patent
White et al.

(10) Patent No.: US 7,794,324 B2
(45) Date of Patent: Sep. 14, 2010

(54) ELECTRONIC PLAYER INTERACTION AREA WITH PLAYER CUSTOMER INTERACTION FEATURES

(75) Inventors: Gehrig Henderson White, Charlotte, NC (US); James T. Crawford, III, Charlotte, NC (US)

(73) Assignee: PokerTek, Inc., Matthews, NC (US)

( * ) Notice: Subject to any disclaimer, the term of this patent is extended or adjusted under 35 U.S.C. 154(b) by 709 days.

(21) Appl. No.: 11/073,516

(22) Filed: Mar. 7, 2005

(65) Prior Publication Data

US 2006/0068864 A1 Mar. 30, 2006

Related U.S. Application Data

(63) Continuation-in-part of application No. 10/939,772, filed on Sep. 13, 2004, now abandoned.

(60) Provisional application No. 60/610,262, filed on Sep. 16, 2004.

(51) Int. Cl.
*A63F 13/00* (2006.01)
(52) U.S. Cl. .............................. 463/29; 463/13; 463/25; 463/42; 273/274; 273/293; 273/294; 273/309
(58) Field of Classification Search ............. 463/10–13, 463/16–22, 25, 29, 40–42; 273/138.1, 139, 273/142 B, 142 A, 142 J, 148 A, 148 R, 148 B, 273/149 P, 149 R, 274, 292–293, 304, 306, 273/309; *A63F 13/00, 1/18*
See application file for complete search history.

(56) References Cited

U.S. PATENT DOCUMENTS

| | | | |
|---|---|---|---|
| 4,052,057 A | 10/1977 | Castle | |
| 4,516,777 A | 5/1985 | Nikora | |
| 4,611,808 A | 9/1986 | Palmer | |

(Continued)

FOREIGN PATENT DOCUMENTS

JP 2004174026 6/2004

(Continued)

OTHER PUBLICATIONS

P&M Poker Table Report & Error Codes (1 page) Jan. 23, 1992.

(Continued)

*Primary Examiner*—Peter DungBa Vo
*Assistant Examiner*—Arthur O. Hall
(74) *Attorney, Agent, or Firm*—Womble, Carlyle, Sandridge & Rice, PLLC

(57) ABSTRACT

A system and method for providing an electronic card game of the present invention includes a table having a table top with a playing surface and a plurality of electronic player interaction areas (EPIAs) located around the playing surface. Each electronic player interaction area is designed to provide a player interface for interaction with one of the players. A wager options buttons, such as "Raise", "Fold", and "Check" buttons are defined in each EPIA to allow the players to make pre-selected wagering action in advance as the electronic card game proceeds. A game computer is coupled to the plurality of EPIAs for administering the electronic card game and for determining when the player is allowed to activate on of the wager options buttons.

12 Claims, 11 Drawing Sheets

U.S. PATENT DOCUMENTS

| | | | |
|---|---|---|---|
| 4,614,342 A | 9/1986 | Takashima | |
| 4,743,022 A | 5/1988 | Wood | |
| 4,760,527 A | 7/1988 | Sidley | |
| 4,860,217 A | 8/1989 | Sasaki et al. | |
| 4,926,327 A | 5/1990 | Sidley | |
| 4,948,134 A | 8/1990 | Suttle et al. | |
| 5,014,991 A | 5/1991 | Mirando et al. | |
| 5,019,973 A | 5/1991 | Wilcox et al. | |
| 5,022,653 A | 6/1991 | Suttle et al. | |
| 5,033,744 A | 7/1991 | Bridgeman et al. | |
| 5,042,818 A | 8/1991 | Weingardt | |
| 5,046,736 A | 9/1991 | Bridgeman et al. | |
| 5,100,137 A | 3/1992 | Fulton | |
| 5,149,104 A | 9/1992 | Edelstein | |
| 5,159,549 A | 10/1992 | Hallman | |
| 5,167,413 A | 12/1992 | Fulton | |
| 5,188,363 A | 2/1993 | Marnell, II et al. | |
| 5,224,706 A | 7/1993 | Bridgeman et al. | |
| 5,242,163 A | 9/1993 | Fulton | |
| 5,249,800 A | 10/1993 | Hilgendorf et al. | |
| 5,251,897 A | 10/1993 | Fulton | |
| 5,255,915 A | 10/1993 | Miller | |
| 5,259,613 A | 11/1993 | Marnell, II | |
| 5,275,400 A | 1/1994 | Weingardt et al. | |
| 5,277,424 A | 1/1994 | Wilms | |
| 5,294,120 A | 3/1994 | Schultz | |
| 5,308,065 A * | 5/1994 | Bridgeman et al. | 463/13 |
| 5,326,104 A | 7/1994 | Pease et al. | |
| 5,332,219 A | 7/1994 | Marnell, II et al. | |
| 5,332,228 A | 7/1994 | Schultz | |
| 5,342,047 A | 8/1994 | Heidel et al. | |
| 5,356,140 A | 10/1994 | Dabrowski et al. | |
| 5,377,973 A | 1/1995 | Jones et al. | |
| 5,393,057 A | 2/1995 | Marnell, II | |
| 5,401,023 A | 3/1995 | Wood | |
| 5,404,442 A | 4/1995 | Foster et al. | |
| 5,407,199 A | 4/1995 | Gumina | |
| 5,411,257 A | 5/1995 | Fulton | |
| 5,415,404 A | 5/1995 | Joshi et al. | |
| 5,423,539 A | 6/1995 | Nagao | |
| 5,429,361 A * | 7/1995 | Raven et al. | 463/25 |
| 5,451,054 A * | 9/1995 | Orenstein | 273/148 R |
| 5,463,725 A | 10/1995 | Henckel et al. | |
| 5,470,079 A | 11/1995 | LeStrange et al. | |
| 5,472,194 A * | 12/1995 | Breeding et al. | 463/27 |
| 5,476,259 A | 12/1995 | Weingardt | |
| 5,505,461 A | 4/1996 | Bell et al. | |
| 5,511,781 A | 4/1996 | Wood et al. | |
| 5,531,440 A | 7/1996 | Dabrowski et al. | |
| 5,531,441 A | 7/1996 | Dabrowski | |
| 5,544,892 A * | 8/1996 | Breeding | 273/292 |
| 5,600,765 A | 2/1997 | Ando et al. | |
| 5,636,843 A | 6/1997 | Roberts | |
| 5,639,088 A | 6/1997 | Schneider et al. | |
| 5,669,817 A | 9/1997 | Tarantino | |
| 5,685,774 A | 11/1997 | Webb | |
| 5,695,402 A | 12/1997 | Stupak | |
| 5,707,285 A | 1/1998 | Place et al. | |
| 5,755,621 A | 5/1998 | Marks et al. | |
| 5,772,506 A | 6/1998 | Marks et al. | |
| 5,788,574 A | 8/1998 | Ornstein et al. | |
| 5,794,964 A | 8/1998 | Jones et al. | |
| 5,803,809 A | 9/1998 | Yoseloff | |
| 5,806,855 A | 9/1998 | Cherry | |
| 5,810,664 A | 9/1998 | Clapper | |
| 5,816,914 A | 10/1998 | Wichinsky | |
| 5,816,915 A | 10/1998 | Kadlic | |
| 5,816,916 A | 10/1998 | Moody | |
| 5,823,873 A | 10/1998 | Moody | |
| 5,833,536 A | 11/1998 | Davids et al. | |
| 5,836,818 A | 11/1998 | Jones et al. | |
| 5,844,547 A | 12/1998 | Minakuchi et al. | |
| 5,851,011 A | 12/1998 | Lott | |
| 5,851,148 A | 12/1998 | Brune et al. | |
| 5,853,325 A | 12/1998 | Kadlic | |
| 5,868,618 A | 2/1999 | Netley et al. | |
| 5,868,619 A * | 2/1999 | Wood et al. | 463/13 |
| 5,876,283 A | 3/1999 | Parra et al. | |
| 5,882,259 A | 3/1999 | Holmes, Jr. et al. | |
| 5,882,260 A | 3/1999 | Marks et al. | |
| 5,902,184 A | 5/1999 | Bennett | |
| 5,902,983 A | 5/1999 | Crevelt et al. | |
| 5,908,353 A | 6/1999 | Andrews | |
| 5,913,726 A | 6/1999 | Jones et al. | |
| 5,941,770 A * | 8/1999 | Miers et al. | 463/13 |
| 5,947,821 A | 9/1999 | Stone | |
| 5,947,822 A | 9/1999 | Weiss | |
| 5,951,397 A | 9/1999 | Dickinson | |
| 5,957,774 A | 9/1999 | Holmes, Jr. et al. | |
| 5,975,528 A | 11/1999 | Halaby | |
| 5,980,385 A * | 11/1999 | Clapper, Jr. | 463/17 |
| 5,984,779 A | 11/1999 | Bridgeman et al. | |
| 6,007,066 A | 12/1999 | Moody | |
| 6,007,424 A | 12/1999 | Evers et al. | |
| 6,012,719 A | 1/2000 | Webb | |
| 6,036,601 A | 3/2000 | Heckel | |
| 6,039,648 A | 3/2000 | Guinn et al. | |
| 6,045,129 A | 4/2000 | Cooper et al. | |
| 6,050,568 A | 4/2000 | Hachquet | |
| 6,056,641 A | 5/2000 | Webb | |
| 6,068,552 A | 5/2000 | Walker et al. | |
| 6,070,878 A | 6/2000 | Jones et al. | |
| 6,093,100 A | 7/2000 | Singer et al. | |
| 6,098,985 A | 8/2000 | Moody | |
| 6,110,040 A | 8/2000 | Sanduski et al. | |
| 6,113,492 A | 9/2000 | Walker et al. | |
| 6,126,542 A | 10/2000 | Fier | |
| 6,129,632 A | 10/2000 | Luciano | |
| 6,135,882 A | 10/2000 | Kadlic | |
| 6,135,883 A | 10/2000 | Hachquet | |
| 6,135,884 A | 10/2000 | Hedrick et al. | |
| 6,146,271 A | 11/2000 | Kadlic | |
| 6,149,157 A | 11/2000 | Suan | |
| 6,149,521 A | 11/2000 | Sanduski | |
| 6,159,095 A | 12/2000 | Frohm et al. | |
| 6,165,069 A | 12/2000 | Sines | |
| 6,179,711 B1 | 1/2001 | Yoseloff | |
| 6,190,254 B1 | 2/2001 | Bennett | |
| 6,196,547 B1 | 3/2001 | Pascal et al. | |
| 6,203,428 B1 | 3/2001 | Giobbi et al. | |
| 6,203,429 B1 | 3/2001 | Demar et al. | |
| 6,203,430 B1 | 3/2001 | Walker et al. | |
| 6,206,780 B1 | 3/2001 | Awada | |
| 6,210,279 B1 | 4/2001 | Dickinson | |
| 6,220,959 B1 | 4/2001 | Holmes, Jr. et al. | |
| 6,220,960 B1 | 4/2001 | Kryzhanovsky | |
| 6,227,969 B1 | 5/2001 | Yoseloff | |
| 6,234,897 B1 | 5/2001 | Frohm et al. | |
| 6,237,916 B1 | 5/2001 | Webb | |
| 6,248,016 B1 | 6/2001 | Walker et al. | |
| 6,257,979 B1 | 7/2001 | Walker et al. | |
| 6,270,404 B2 | 8/2001 | Sines et al. | |
| 6,270,405 B1 | 8/2001 | Ferguson | |
| 6,273,820 B1 | 8/2001 | Haste, III | |
| 6,283,855 B1 | 9/2001 | Bingham | |
| 6,293,866 B1 | 9/2001 | Walker et al. | |
| 6,299,170 B1 | 10/2001 | Yoseloff | |
| 6,299,534 B1 | 10/2001 | Breeding et al. | |
| 6,312,333 B1 | 11/2001 | Acres | |
| 6,312,334 B1 | 11/2001 | Yoseloff | |
| 6,319,122 B1 | 11/2001 | Packes, Jr. et al. | |
| 6,332,839 B2 | 12/2001 | Walker et al. | |
| 6,334,613 B1 | 1/2002 | Yoseloff | |
| 6,342,007 B1 | 1/2002 | Wood et al. | |

| | | |
|---|---|---|
| 6,343,988 B1 | 2/2002 | Walker et al. |
| 6,343,989 B1 | 2/2002 | Wood et al. |
| 6,358,144 B1 | 3/2002 | Kadlic et al. |
| 6,368,214 B1 | 4/2002 | Luciano |
| 6,368,216 B1 | 4/2002 | Hedrick |
| 6,371,851 B1 | 4/2002 | Singer et al. |
| 6,379,245 B2 * | 4/2002 | De Keller ............... 463/13 |
| 6,382,628 B2 | 5/2002 | Stern |
| 6,386,973 B1 | 5/2002 | Yoseloff |
| 6,398,645 B1 | 6/2002 | Yoseloff |
| 6,406,023 B1 | 6/2002 | Rowe |
| 6,409,174 B1 | 6/2002 | Demarest |
| 6,416,406 B1 | 7/2002 | Duhamel |
| 6,416,407 B1 | 7/2002 | Carrico et al. |
| 6,419,578 B1 | 7/2002 | Moody et al. |
| 6,422,940 B1 | 7/2002 | Walker et al. |
| 6,443,456 B1 | 9/2002 | Gajor |
| 6,454,266 B1 | 9/2002 | Breeding et al. |
| 6,454,651 B1 | 9/2002 | Yoseloff |
| 6,457,714 B1 | 10/2002 | Feola |
| 6,467,771 B1 | 10/2002 | deKeller |
| 6,478,675 B1 | 11/2002 | Awada |
| 6,491,298 B1 | 12/2002 | Criss-Puszkiewicz et al. |
| 6,511,068 B1 | 1/2003 | Sklansky et al. |
| 6,517,073 B1 * | 2/2003 | Vancura ............... 273/274 |
| 6,517,074 B1 | 2/2003 | Moody et al. |
| 6,517,437 B1 | 2/2003 | Wells et al. |
| 6,530,842 B1 | 3/2003 | Wells et al. |
| 6,536,768 B2 | 3/2003 | Caputo |
| 6,537,150 B1 | 3/2003 | Luciano et al. |
| 6,544,120 B2 | 4/2003 | Ainsworth |
| 6,550,771 B1 * | 4/2003 | Weaver et al. ............... 273/292 |
| 6,558,253 B1 | 5/2003 | DeSimone et al. |
| 6,561,897 B1 | 5/2003 | Bourbour et al. |
| 6,561,898 B2 | 5/2003 | Moody |
| 6,565,088 B2 | 5/2003 | Perrie et al. |
| 6,565,432 B2 | 5/2003 | Moody |
| 6,568,680 B1 | 5/2003 | Moody et al. |
| 6,569,013 B1 | 5/2003 | Taylor |
| 6,569,014 B2 | 5/2003 | Walker et al. |
| 6,575,467 B1 | 6/2003 | Kal |
| 6,585,587 B2 | 7/2003 | Falciglia, Sr. |
| 6,589,115 B2 | 7/2003 | Walker et al. |
| 6,592,456 B2 | 7/2003 | Walker et al. |
| 6,612,926 B1 | 9/2003 | Dabrowski |
| 6,616,142 B2 | 9/2003 | Adams |
| 6,622,445 B1 | 9/2003 | Shillingburg et al. |
| 6,626,433 B2 * | 9/2003 | Scibetta ............... 273/292 |
| 6,626,757 B2 * | 9/2003 | Oliveras ............... 463/13 |
| 6,629,889 B2 | 10/2003 | Mothwurf |
| 6,651,985 B2 | 11/2003 | Sines et al. |
| 6,652,377 B1 * | 11/2003 | Moody ............... 463/13 |
| 6,656,040 B1 | 12/2003 | Brosnan et al. |
| 6,656,044 B1 | 12/2003 | Lewis |
| 6,656,052 B2 | 12/2003 | Abramopoulos et al. |
| 6,659,863 B2 | 12/2003 | Ashley et al. |
| 6,659,866 B2 | 12/2003 | Frost et al. |
| 6,672,959 B2 | 1/2004 | Moody et al. |
| 6,695,695 B2 * | 2/2004 | Angel ............... 463/13 |
| 6,702,667 B2 | 3/2004 | Mattice et al. |
| 6,702,672 B1 | 3/2004 | Angell et al. |
| 6,705,943 B2 | 3/2004 | Awada |
| 6,708,975 B1 | 3/2004 | Fox et al. |
| 6,712,694 B1 | 3/2004 | Nordman |
| 6,722,974 B2 | 4/2004 | Sines et al. |
| 6,722,985 B2 | 4/2004 | Criss-Puszkiewicz et al. |
| 6,726,427 B2 * | 4/2004 | Jarvis et al. ............... 273/292 |
| 6,729,620 B2 | 5/2004 | Jones |
| 6,729,621 B2 | 5/2004 | Moody |
| 6,729,956 B2 | 5/2004 | Wolf et al. |
| 6,729,958 B2 | 5/2004 | Burns |
| 6,739,970 B2 | 5/2004 | Luciano |
| 6,743,094 B2 | 6/2004 | Johnson |
| 6,743,102 B1 | 6/2004 | Fiechter et al. |
| 6,749,501 B2 | 6/2004 | Crawford |
| 6,752,395 B2 | 6/2004 | Jones et al. |
| 6,769,982 B1 | 8/2004 | Brosnan |
| 6,800,026 B2 | 10/2004 | Cannon |
| 6,805,630 B2 * | 10/2004 | Rubeli ............... 463/20 |
| 6,920,619 B1 | 7/2005 | Milekic |
| 7,059,965 B2 * | 6/2006 | Jackson ............... 463/16 |
| 7,128,646 B2 * | 10/2006 | Baerlocher et al. ............... 463/16 |
| 7,201,654 B1 * | 4/2007 | Jarvis et al. ............... 463/13 |
| 7,255,351 B2 * | 8/2007 | Yoseloff et al. ............... 273/274 |
| 7,264,243 B2 * | 9/2007 | Yoseloff et al. ............... 273/292 |
| 7,306,516 B2 | 12/2007 | Iosilevsky |
| 7,331,868 B2 | 2/2008 | Beaulieu et al. |
| 7,338,365 B1 * | 3/2008 | Luciano, Jr. ............... 463/13 |
| 7,367,563 B2 * | 5/2008 | Yoseloff et al. ............... 273/292 |
| 7,452,270 B2 * | 11/2008 | Walker et al. ............... 463/17 |
| 7,510,190 B2 * | 3/2009 | Snow et al. ............... 273/292 |
| 2001/0007828 A1 | 7/2001 | Walker et al. |
| 2001/0028147 A1 * | 10/2001 | Ornstein et al. ............... 273/292 |
| 2001/0052671 A1 | 12/2001 | Stern |
| 2002/0018051 A1 | 2/2002 | Singh |
| 2002/0036381 A1 * | 3/2002 | Scibetta ............... 273/292 |
| 2002/0094855 A1 | 7/2002 | Berman |
| 2002/0173352 A1 | 11/2002 | Oliveras |
| 2003/0032469 A1 | 2/2003 | Moody et al. |
| 2003/0064767 A1 | 4/2003 | Brown |
| 2003/0070178 A1 | 4/2003 | Boyd et al. |
| 2003/0083119 A1 | 5/2003 | Hogan et al. |
| 2003/0087685 A1 | 5/2003 | Hogan et al. |
| 2003/0090063 A1 * | 5/2003 | Jarvis et al. ............... 273/292 |
| 2003/0107175 A1 | 6/2003 | Loewenstein et al. |
| 2003/0153380 A1 | 8/2003 | Dreaper et al. |
| 2003/0164590 A1 | 9/2003 | Moody |
| 2003/0176211 A1 | 9/2003 | Sommerville |
| 2003/0176214 A1 | 9/2003 | Burak |
| 2003/0189290 A1 | 10/2003 | Moody |
| 2004/0036219 A1 | 2/2004 | Schibetta |
| 2004/0053661 A1 | 3/2004 | Jones et al. |
| 2004/0082372 A1 | 4/2004 | Romero |
| 2004/0092301 A1 * | 5/2004 | Williams ............... 463/16 |
| 2005/0032563 A1 | 2/2005 | Sines |
| 2005/0040601 A1 * | 2/2005 | Yoseloff et al. ............... 273/292 |
| 2005/0059458 A1 | 3/2005 | Griswold et al. |
| 2005/0090304 A1 | 4/2005 | Crawford et al. |
| 2005/0127606 A1 * | 6/2005 | Snow et al. ............... 273/292 |
| 2006/0068864 A1 | 3/2006 | White et al. |
| 2006/0068866 A1 | 3/2006 | White et al. |
| 2006/0189365 A1 | 8/2006 | Crawford, II et al. |
| 2006/0189384 A1 | 8/2006 | Crawford, III et al. |

FOREIGN PATENT DOCUMENTS

| WO | 0016863 | 3/2000 |
|---|---|---|
| WO | 02084556 | 10/2002 |

OTHER PUBLICATIONS

Pacific Poker: "Joining A Waiting List"; Internet Portal of Pacific Poker, Jun. 22, 2004; XP002361353; URL: http://web.archive.org/web/20040622085221/http://www.pacificpoker.com/>; retrieved on Jan. 3, 2006.

Paradise Poker: "Quick Tour of Paradise Poker"; Internet Citation, Jun. 10, 2004; XP002359402; URL: http://web.archive.org/web/20040610173651/www.paradisepoker.com/quick_tour.html>; retrieved on Dec. 15, 2005.

International Search Report PCT/US 2005/031217; received from Patent Cooperation Treaty Jul. 23, 2007; 21 pages.

International Search Report PCT/US 2007/005650; received from Patent Cooperation Treaty Sep. 10, 2007; 16 pages.

European Search Report App No. 05792928.3; received from European Patent Office Aug. 6, 2007; 7 pages.

European Search Report App No. 05794343.3; received from European Patent Office Aug. 6, 2007; 7 pages.

European Search Report App No. 05792685.9; received from European Patent Office Aug. 6, 2007; 7 pages.

European Search Report App No. 05792637.0; received from European Patent Office Aug. 6, 2007; 7 pages.

European Search Report App No. 05792929.1; received from European Patent Office Aug. 6, 2007; 7 pages.

European Search Report App No. 05792604.0; received from European Patent Office Jul. 16, 2007; 8 pages.

European Search Report App No. 05792920.0; received from European Patent Office Jul. 16, 2007; 8 pages.

"Video Poker", http://thewizardofodds.com/games/vidpok.html, Dec. 12, 2001.

Official Action in U.S. Appl. No. 10/939,772 mailed Mar. 25, 2008.

Prior to Feb. 11, 2005, P&M Poker Table brochure (2 pages), Reno, Nevada, USA.

* cited by examiner

ELECTRONIC PLAYER INTERACTION AREA WITH PLAYER CUSTOMER INTERACTION FEATURES

RELATED APPLICATIONS

The present application is a continuation-in-part of U.S. patent application Ser. No. 10/939,772, filed Sep. 13, 2004 now abandoned, and claims the benefit of U.S. Provisional Patent Application Ser. No. 60/610,262 filed on Sep. 16, 2004, both of which are incorporated herein by reference.

FIELD OF THE INVENTION

The present invention related generally to a system and method for providing an electronic card game.

BACKGROUND OF THE INVENTION

Gaming is an increasingly popular form of entertainment. Games, particularly, games of chance and skill in which one or more players play and place wagers on the outcome thereof may be played in a variety of ways, including at a casino or other venue or on the Internet. Of the various forms of games which are available for play, many are played with playing cards. Of these, poker is arguably the most popular.

Traditionally, poker is played at a table with several players wagering paper, coin money or chips on a series of playing cards dealt from a deck of fifty-two cards. This deck is comprised of four suits at thirteen cards per suit. This form of poker requires a human dealer to coordinate the game, including dealing, wagering, folding, etc. One of the problems with traditional poker is that it suffers from the possibility of human/dealer error. In "social" card games, especially poker, the players take turns acting as the dealer, but in licensed commercial gaming establishments, such as casinos, the dealer is typically a non-playing employee. Thus, another problem associated with traditional poker games in this context is the training and retention of dealers.

One alternative form of gaming, with particular reference to poker, has flourished on the internet. Internet gaming has become quite successful in that it provides many choices for the players. In particular, Internet gaming is fast and convenient, with registration, betting and payouts available from almost any computer with Internet access and with payments typically arranged via a pay service, such as PayPal.

Video poker or other card games may also be provided by stand-alone machines similar to slot machines.

Typically, both stand-alone and Internet poker games provide players with wager options or the wager actions that each player may choose from. These wager actions include are fold, check, call, bet or raise. Fold means that a player does not want to meet the pending bet or raise amount. Such player surrenders his two hole cards; and such player surrenders whatever moneys he has wagered so far up to that betting round of the poker hand. Check means that a player does not want to bet when there is no pending bet or no pending raise amount. Call means that a player puts into the pot the same amount as the pending bet or raise amount. Bet means that a player bets the amount allowed during that betting round. Such bet amount may be the big blind amount or double the big blind amount depending on the betting round. Raise means that the player bets an amount greater than the pending bet or pending raise amount. Such raise amount may be a multiple of the big blind amount or a multiple of double the big blind amount allowed during that betting round. Side pots are created as follows. A player must either fold, check, call, bet, or raise. Such player has a certain number of chips in front of him at that time of play. If such player is not able to call the whole pending bet amount or pending raise amount; or if such player is not able to make a whole bet; or if such player is not able to make a whole raise, then the dealer creates a side pot in addition to the already existing main pot. The dealer determines the reduced amount that such player can call, bet or raise. Then the dealer places that amount into the main pot times the number of active players still in the hand at that time. For example, if the all-in player has only $5 and there are 4 active players in the hand, then the dealer places $20 into the main pot. The dealer then creates the side pot from the difference that the other 3 active players further call, bet or raise. The all-in player can only win the main pot. The other 3 active players can win the main pot and/or the side pot.

One major drawback of Internet and stand-alone type games is the lack of the human element. Many people prefer to play poker against other players, due in part to the drama associated with "live" gaming. Undoubtedly, an elevated level of competition exists when humans compete directly against one another. In gaming establishments, experienced players are trying to hone strategy and read other players' intentions through their movements and style of play to be more competitive.

Another major drawback of internet and stand-alone type games discussed above, is inability, under certain situations, of the player to make pre-selection of the wager actions that each player may choose from in a private and secure fashion available to the player and non-visible to the players adjacent the player making pre-selection of the wager actions.

The present invention is aimed at one or more of the problems set forth above.

BRIEF SUMMARY OF THE INVENTION

In one aspect of the present an electronic card table for providing an electronic card game to a plurality of players includes a table having a table top with a playing surface. A plurality of electronic player interaction areas are located around a periphery of the table top for use by a plurality of players. A wagering interface is provided by each electronic player interaction area for allowing the player to send a pre-selected wagering action from the electronic player interaction area. A network of the present invention includes a game computer coupled to the plurality of electronic player interaction areas for administering at least one betting round of the electronic card game. During one of the betting rounds the game computer responds to wagering action sent by the player and stores the pre-selected wagering action in the game computer thereby allowing the player to proceed with the pre-selected wagering action. The game may allow the player to select a wagering action other than the pre-selected wagering action as the game computer determines a turn of the player in the betting round.

In another aspect of the present invention a method of providing an electronic poker game to a plurality of players is provided. The method includes the steps of providing the electronic card table having the table top with the playing surface. The following step of the method includes providing the plurality of electronic player interaction areas located around the periphery of the table top in a manner that each electronic player interaction area is designed to provide the wagering interface thereby allowing the player to send the pre-selected wagering action from the electronic player interaction area. The next step of the method includes providing the game computer coupled to the plurality of electronic player interaction areas for administering at least one betting round of the electronic card game. The following step includes responding to the wagering action sent by the player and storing the pre-selected wagering action in the game computer. The method also includes allowing the player to proceed with the pre-selected wagering action. Alternatively, the method may include the step of allowing the player to select the wagering action other than the pre-selected wagering action as the game computer determines a turn of the player in the betting round.

The use of the electronic player interaction areas networked to the game computer, which allows the players to request a new EPIA provides instantaneous detection of the vacancy of the new EPIA and assignment of the player who is the first to request the new EPIA. Furthermore, by utilizing an electronic system in the present invention, the player is allowed to make pre-selection of the wager actions that the player may choose from in a private and secured fashion available to the player and non-visible to the players adjacent the player making pre-selection of the wager actions.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF INVENTION

Figure 1:
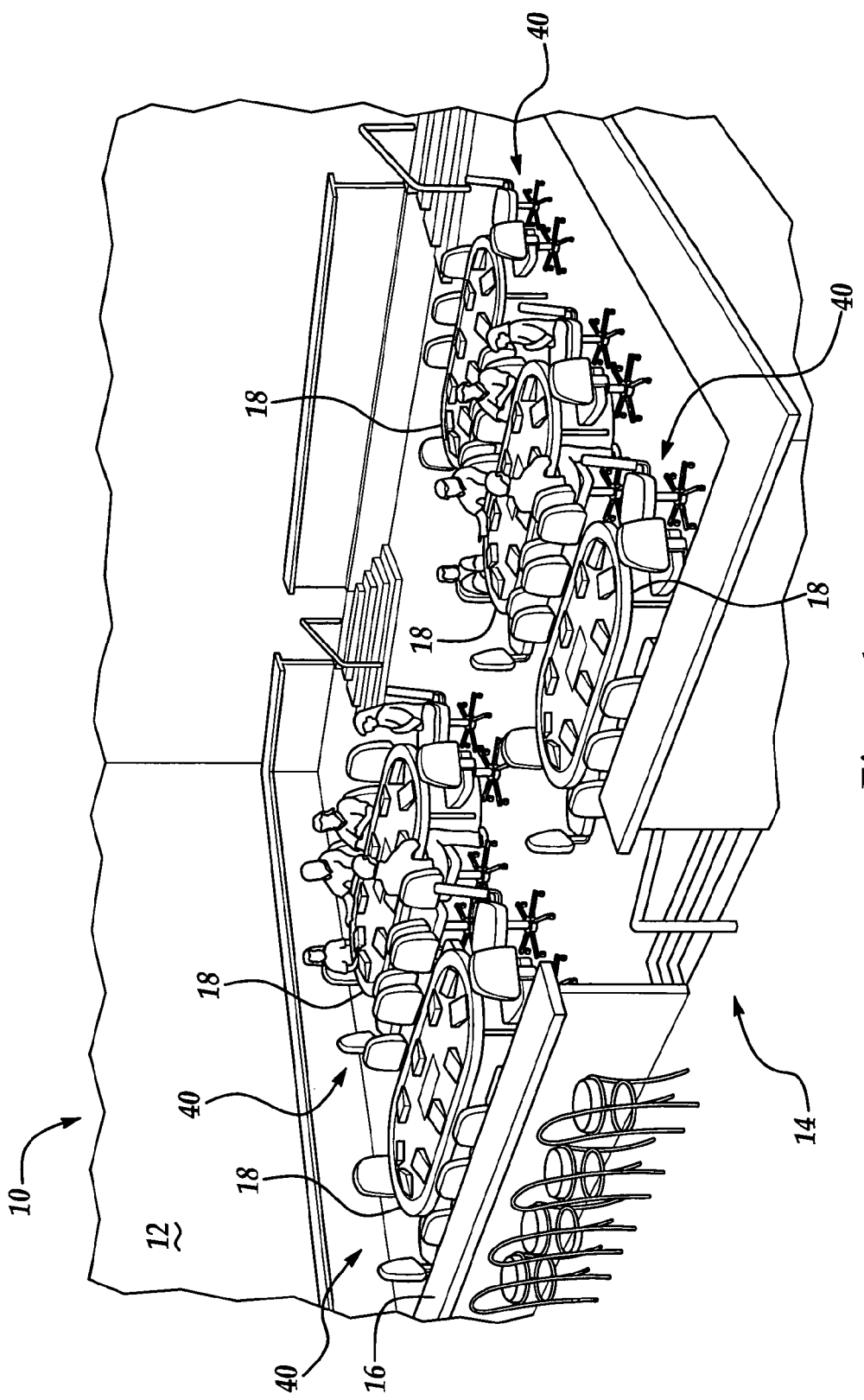
FIG. 1 is a diagrammatic illustration of a system for providing an electronic poker game on one or more electronic poker tables, according to an embodiment of the present invention.

With reference to the drawings and in operation, the present invention relates generally to a system 10 and method for providing, and being related to an electronic card game, such as electronic poker. With specific reference to FIG. 1, the system 10 is designed to be situated in a gaming environment, such as a casino 12. Typically, such gaming environments 12 are a specialized or designated area within the casino 12, such as a poker room or poker area 14, which has been cordoned off by, for example, a railing 16. While the above refers to one possible implementation or location in which the system 10 may be used, the present invention is not limited to any such location or implementation. Other details of the system may be found in U.S. Patent Application Ser. Nos. N/A (File No. 60,677-007), N/A (File No. 60,677-008), N/A (File No. 60,677-009), N/A (File No. 60,677-010), N/A (File No. 60,677-011), N/A (File No. 60,677-012), N/A (File No. 60,677-013), N/A (File No. 60,677-014), N/A (File No. 60,677-015), N/A (File No. 60,677-016), N/A (File No. 60,677-017), N/A (File No. 60,677-018), N/A (File No. 60,677-019), N/A (File No. 60,677-020), N/A (File No. 60,677-021), N/A (File No. 60,677-022), N/A (File No. 60,677-023), N/A (File No. 60,677-025), N/A (File No. 60,677-027), N/A (File No. 60,677-028), N/A (File No. 60,677-029), N/A (File No. 60,677-030), N/A (File No. 60,677-031) and N/A (File No. 60,677-032), which are hereby incorporated by reference.

In the illustrated embodiment, the system 10 utilizes electronic chips and electronic playing cards to provide an automated card game for play by two or more players. In one aspect of the present invention, a human dealer is not required. The system 10 may handle all dealer functions.

The system 10 may be used to play any variation or version of any card game. However, for the purposes of discussion, the system 10 will be described as adapted for use in implement the version of poker known as, Texas Hold'em.

In one aspect of the present invention, the system 10 may handle assigning players to a seat, providing electronic chips, accepting wagers, and assigning a pot to the winning player. The system 10 electronically shuffles a set of electronic playing cards and deals the electronic playing cards to the player and any common cards to an electronic card or poker table 18. The system 10 may also handle wagering, folding, calling by the players and may restrict such, based on whose turn it is.

In another aspect of the present invention, the card or poker tables 18 in the system 10 are networked and connected to one or more servers (see below). The server may be used to implement and facilitate, player tracking, ticket in ticket out (cashless) wagering, assigning player's to a seat at a particular table, tournament play, table set-up (including turning the tables on and off and modifying table parameters), and progressive jackpots.

As shown in the illustrated embodiment, the system 10 includes a plurality of electronic poker tables 18. In the embodiment shown in FIG. 1, the system 10 includes five electronic poker tables 18A-18J, although the present invention is not limited to a specific number of electronic poker tables.

Figure 2:
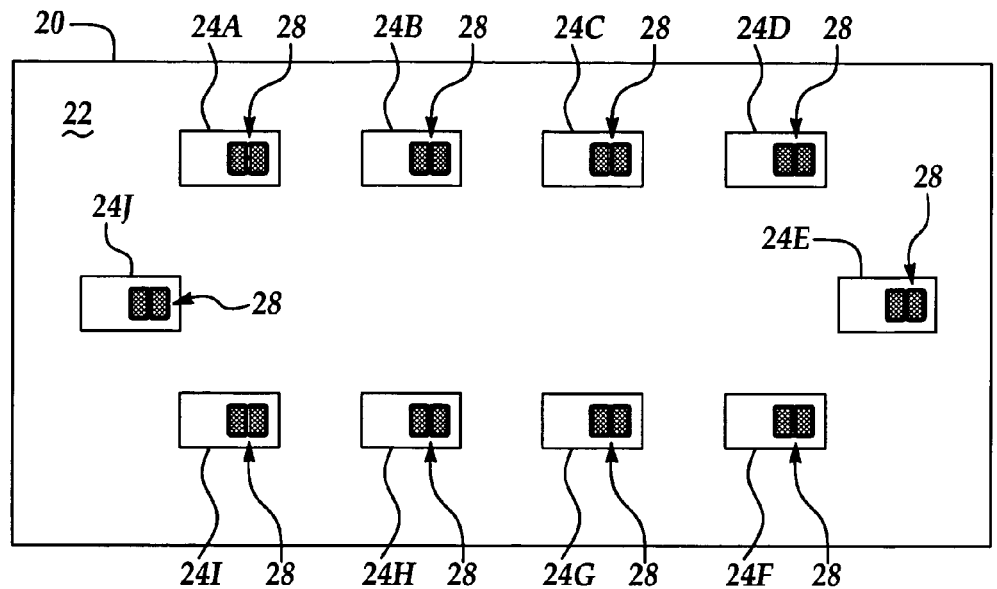
FIG. 2 is a simplified diagram of a table top of the electronic poker tables of FIG. 1, according to an embodiment of the present invention.
Figure 3:
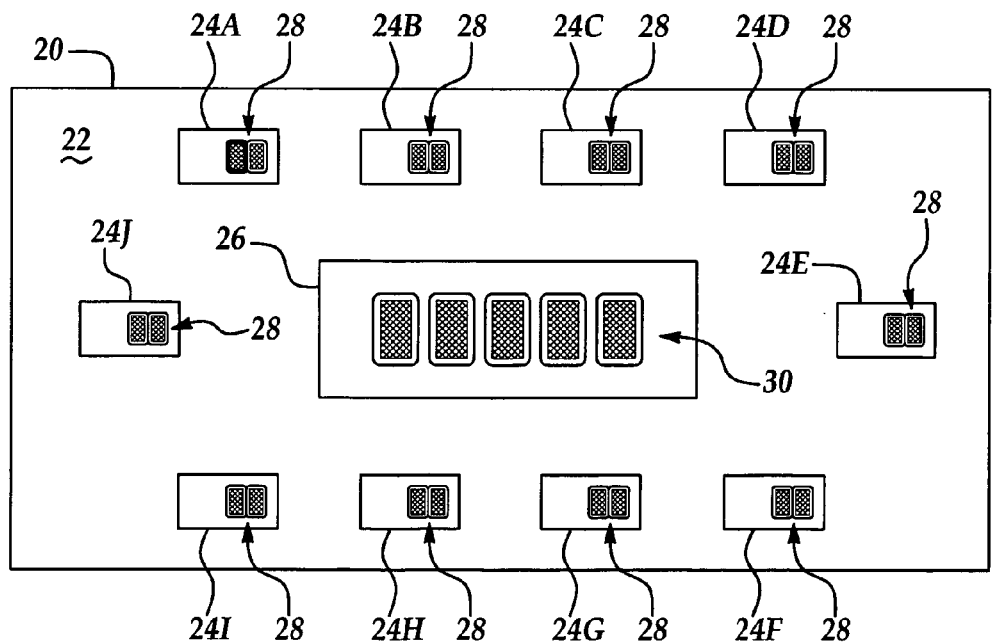
FIG. 3 is a simplified diagram of a table top of the electronic poker tables of FIG. 1, according to another embodiment of the present invention.

A simple representative layout of a table top 20 of the poker tables 18, according to first and second embodiments of the present invention are shown in FIGS. 2 and 3, respectively.

In the top view of the table top 20 shown in FIG. 2, the table top 20 includes a playing surface 22 and a plurality of electronic player interaction areas 24. In the illustrated embodiment, the poker tables 18 are able to seat a maximum often players at a time, and thus, includes ten electronic player interaction areas 24A-24J.

In the top view of the table top 20 shown in FIG. 3 (in which like elements are labeled with the same reference numbers), the table top 20 includes a playing surface 22 and a plurality of electronic player interaction areas (EPIA) 24. In the illustrated embodiment, the poker tables 18 are able to seat a maximum of ten players at a time, and thus, includes ten electronic player interaction areas 24. The table top 10 also includes a central or common display area (CDA) 26.

In one embodiment, the individual electronic player interaction areas 24 are used to convey game information directly to a player assigned to a specific player interaction area 24A-24J and to implement a player user interface (see below) to effectuate interaction or input from the player. The central or common display area 26 is used to display information to all of the players.

For example in one embodiment, the system 10 is used to play the version of poker known as Texas Hold'em. In Texas Hold'em, each player is dealt a number of cards, e.g., two cards, face down. These are known as a player's "hole" cards 28. A number of cards, e.g., three or five, are dealt face-up and displayed in the common display area 26. These are known as the common cards 30. A player's hand, thus, consists of the player's hole cards 28 and the common cards 30. At the end of each hand, of the remaining players, whichever player's hand makes the highest poker hand is the winner of that round or hand of poker.

In one aspect of the present invention, the hole cards 28 are displayed face-down on the respective electronic player interaction area 24 and the common cards are displayed in the central display area 26. The hole cards 28 are displayed at a first predetermined ratio and the common cards 30 are displayed at a second predetermined ratio. The first and second predetermined ratios may be expressed as a ratio of a standard size playing card or a predetermined default size. In one embodiment, the first and second ratios are the same. In another embodiment, the first and second ratios are different. For example, the first and second ratios may be defined such that the common cards 30 are displayed larger than the hole cards 28.

Figure 6:
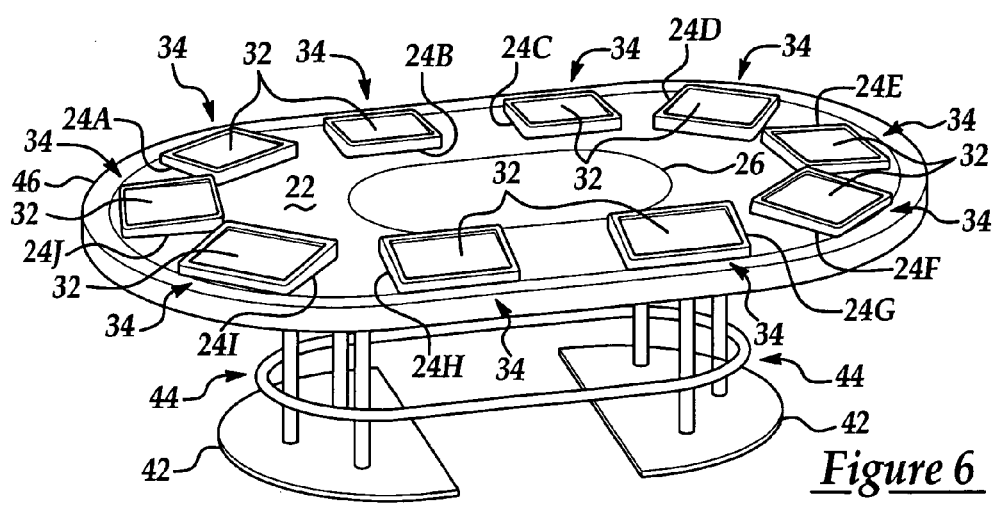
FIG. 6 is a diagrammatic illustration of an electronic poker table, according to an embodiment of the present invention.
Figure 7:
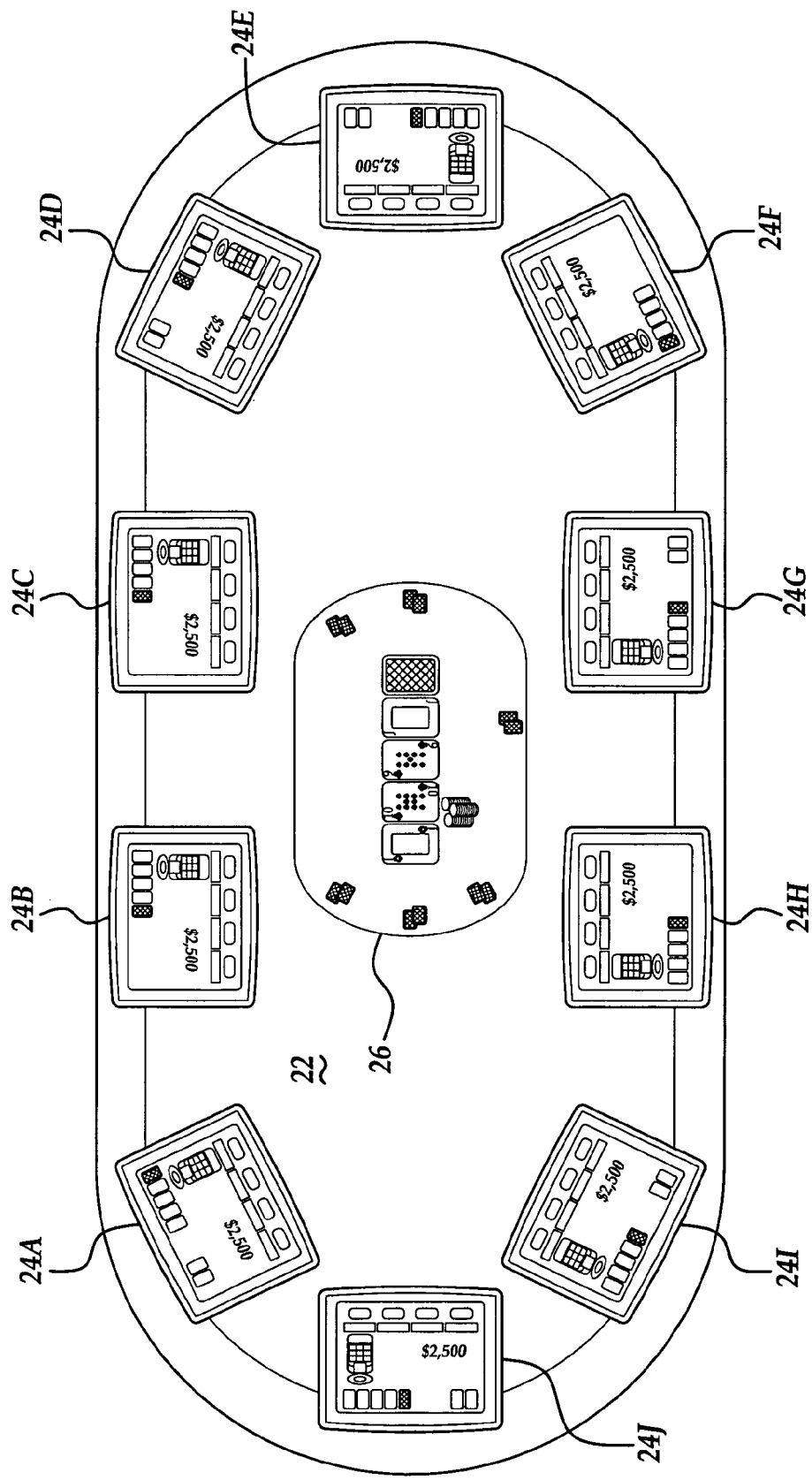
FIG. 7 is a top view of the electronic poker table of FIG. 6.
Figure 8:
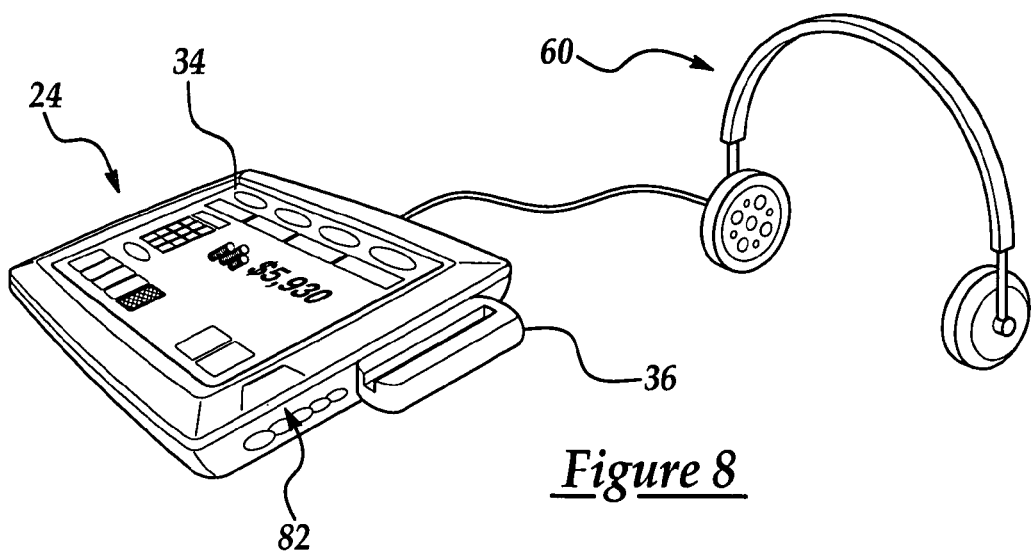
FIG. 8 is a diagrammatic illustration of a module of the electronic poker table of FIG. 6, according to an embodiment of the present invention.
Figure 11:
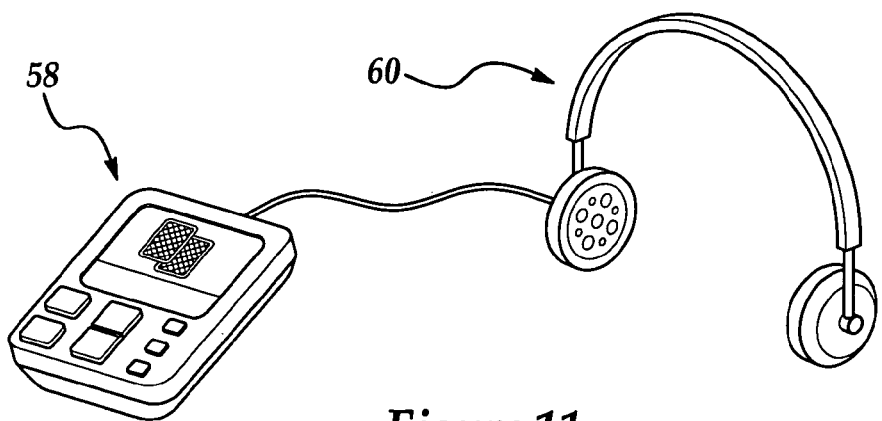
FIG. 11 is a representation of an electronic player interaction area of the system of FIG. 1 embodied in a hand-held device.

With reference to FIGS. 6, 7, and 8 in one embodiment, the electronic player interaction areas 24 are implemented using separate display devices, such as touchscreen displays 32. Each display 32 may be housed in a removable module 34.

The module 34 may incorporate a fully-functional computer. The computer includes a processor capable of running an operating system, such as Windows XP or Windows CE, both available from Microsoft Corporation of Redmond, Wash. In one embodiment, the module 34 includes a card reader 36 for reading a player ID card (not shown).

In the illustrated embodiment, the modules 34 are mounted into the table top 20, such that the touchscreen display 32 is parallel to the table top 20. However, the touchscreen display 32 may be mounted at an angle with respect to the table top 20. Alternatively, the modules 34 may be adjustable to provide an adjustable viewing angle of the touchscreen display 32.

In one embodiment, the central display area 26 is implemented in a separate display 38, such as a LCD or plasma monitor or similar device.

The remainder of the table top may be covered in a material such as felt, or more specifically, green, blue, or red felt. Logos, game information, or other information may be printed on the material.

In an alternative embodiment, the electronic player interaction areas 24 and the central display area 26 may be implemented in a single display which covers a large portion of the table top. The electronic player interaction areas 24 and the central display area 26 may be set apart from the rest of the table top 20 by virtual borders. The areas of the display around the electronic player interaction areas 24 and the central display area 26 may be used to simulate the table top of a standard poker table, e.g., an image of material, such as green felt, may be displayed. Furthermore, logos, game information, other information, advertisements, announcements, pictures, videos, or other information may be displayed, rotated, cycled, or displayed for a limited period of time on the table top 20 and/or the electronic player interaction areas 24.

As discussed below, the system 10 and poker tables 18, although electronic, are designed to convey and retain the overall sense and ambience of a standard poker room with non-electrical poker tables. Each electronic poker table 18 is surrounded by a number of poker chairs 40. The number of poker chairs 40 being equal to the number of electronic player interaction areas 24 on the electronic poker table 18.

With particular reference to FIGS. 6 and 7, in the illustrated embodiment the poker tables 18 have an oval shape and may seat a maximum number of players. For example, the poker tables 18 may be sized to seat a maximum of 7, 8, 9, 10, or 11 players, although the present invention is not limited to any particular sized poker table. As stated above the table top is covered, in between the electronic player interaction area, and the central or common display area if provided, by material, such as green felt, or simulation thereof. The poker table includes one or more bases 42 to which one or more legs 44 are connected. The legs 44 support the table top. A rail or bumper 46 encircles the outer circumference of the table top 20.

Figure 4:
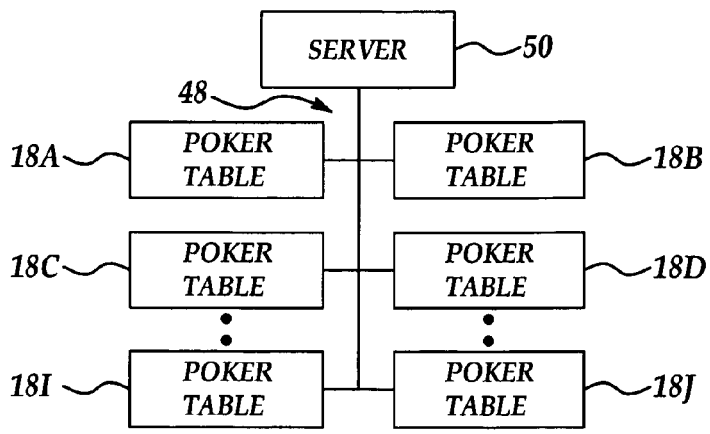
FIG. 4 is a block diagram of the system of FIG. 1, according to an embodiment of the present invention.
Figure 5:
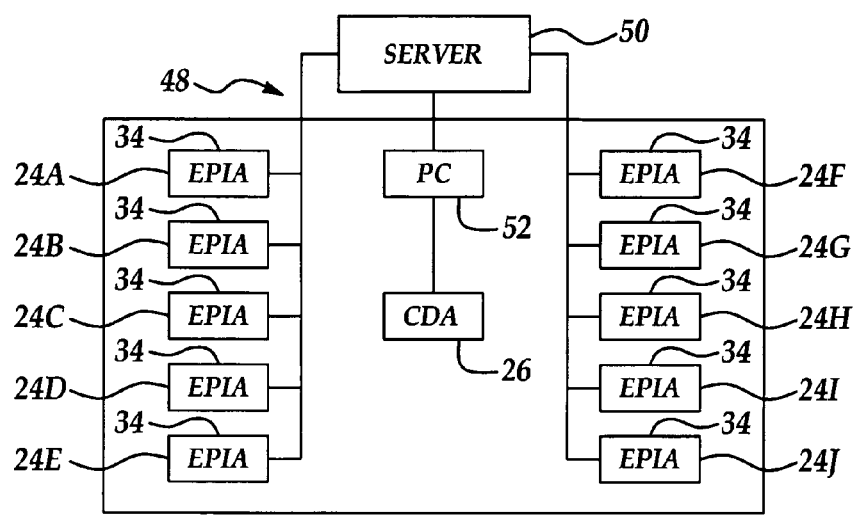
FIG. 5 is a second block diagram of the system of FIG. 1, including the element of an electronic poker table, according to an embodiment of the present invention.

With specific reference to FIGS. 4 and 5, as discussed above the system 10 may include one or more electronic poker tables 18. In one aspect of the present invention, the poker tables 18 are networked together using, e.g., an Ethernet network 48. One or more server 50 may be used to provide functionality for the system 10. For example, the server 50 may be used to implement various functions, including, but not limited to:

starting and stopping the tables 18 on a game,
    data and player tracking,
    cashless wagering, defining and modifying table parameters, including, turning the tables 18 on and off, setting the poker game being played at the table 18, setting wager parameters, etc. . . . , defining and managing jackpots, including the a house percentage, i.e., the rake, defining and managing progressive jackpots, establishing and managing a queue for players and assigning players to seats and/or specific tables from the queue, and establishing and managing tournament play, including assigning player seats, collapsing tables, etc. . . .

With particular reference to FIG. 5, in one embodiment each table 18 includes ten electronic player interaction areas 24 which are implemented in a computer based module 34. Each module 34 operates or runs on an operating system, such as Microsoft Windows XP or Windows CE. Each module 34 is connected to the server 50 through the network 48. As shown, another computer 52, such as a personal computer running on Windows XP, may also be connected to the server 50 through the network 48. The primary function of the PC 52 may be to control and drive the central display area 28.

In one embodiment, the server 50 runs the poker games on each of the tables 18. The primary function of the modules 34 is to run the electronic player interaction areas 24, to display and run a user interface.

In another embodiment, the poker game or portions of the poker game may be executed or run by the modules 34 and/or the computer 52.

In another aspect of the present invention, the system 10 will implement a player-account based cash in/cash out system. The system 10 will create a user account for each player. Once an account is established for the player, the player is issued a Player Card having an associated personal identification number or PIN. Once the player has been issued a Player Card, their account may be funded. The Player Card is used to identify the player at the tables 18. The player may fund their account by bringing cash to a cage, where the cash is accepted and credited to the player's account. Printed receipts are given to the player and maintained by the casino 12. To bring electronic chips to the table 18, the player sits down at a seat, swipes their Player Card and enters their PIN. The system 10 informs the player of their account balance and allows them to convert all or a portion of the account balance to electronic chips to bring to the game.

Figure 13A:
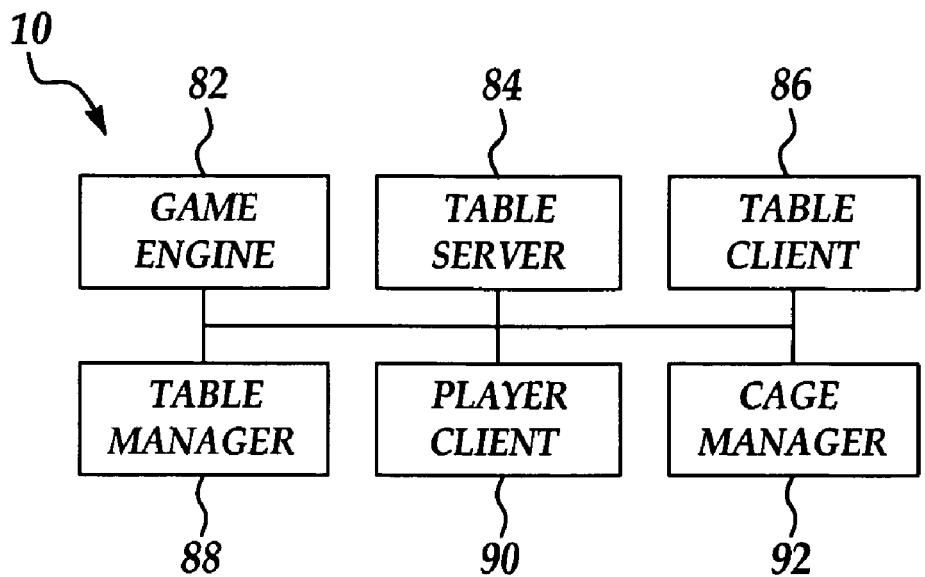
FIG. 13A is a block diagram of software components of the system of the present invention.

With particular reference to FIG. 13A, from a software perspective the system 10 may be implemented using six program groups: a game engine 82, a table server 84, a table client 86, a player client 88, a table manager 90, and a cage manager 92. The table server 84 implements the network communication, control and authentication as well as inter-table functions (seat reservations, multi-table tournaments). The game engine 82 administers the electronic poker game and is responsible for all game functions, e.g., electronic playing card deck generation, dealing, betting, determining winners and awarding pots. The table client 86 is the graphical control for the central data area 26. The player client 90 implements the user interface for the electronic player interaction areas 24 and the logic for capturing player input and communication the player input to the table client server. The table manager 88 contains the user interface for setting user, network, and game parameters, for starting, pausing, and stopping games, and for monitoring game activity and responding to system or user generated alerts. The cage manager 92 provides the ability to create and fund player accounts and to create the Player Cards.

Figure 9:
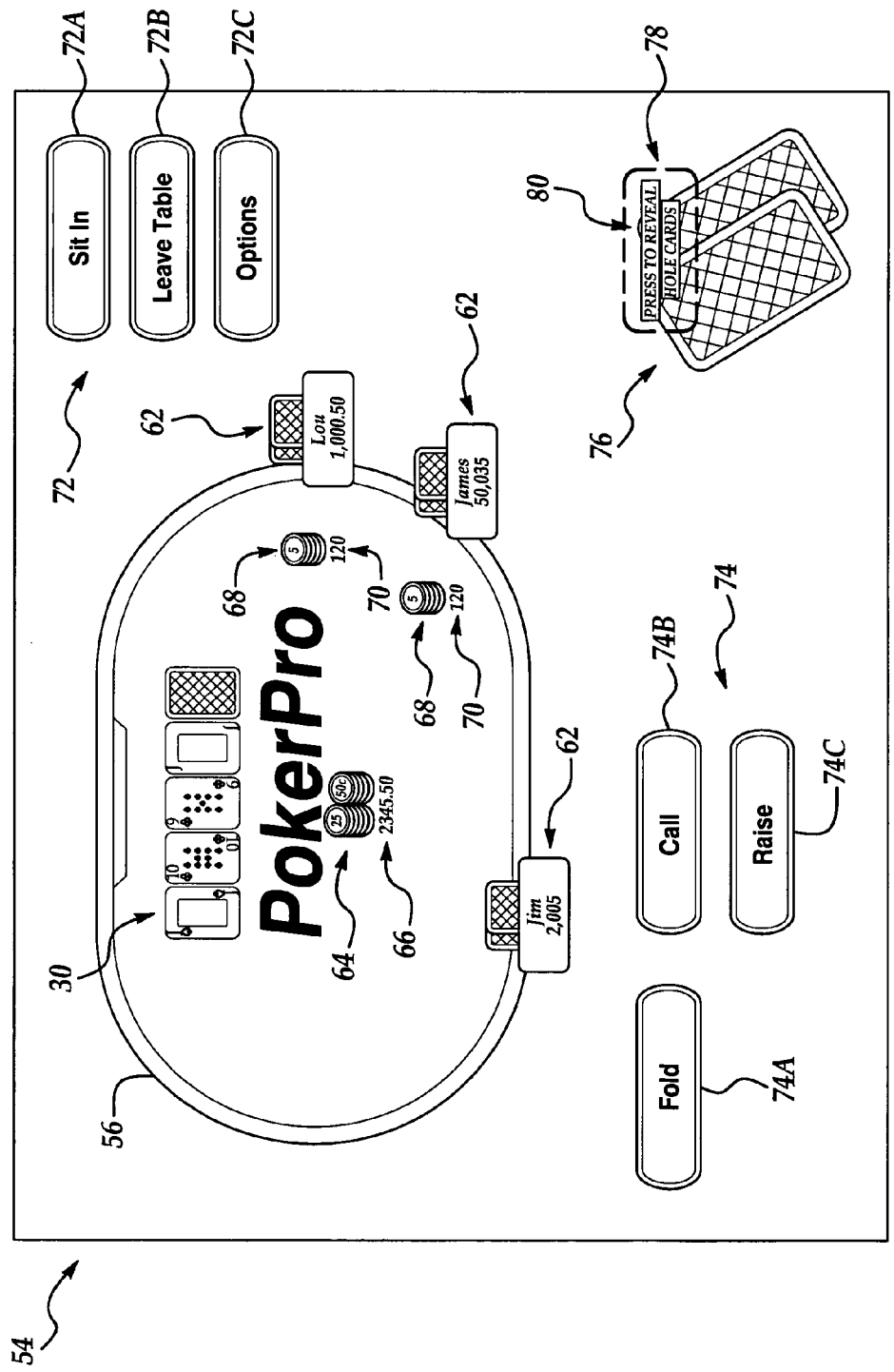
FIG. 9 is a representation of a first screen shot displayed on an electronic player interaction area of the system of FIG. 1, according to an embodiment of the present invention.
Figure 10:
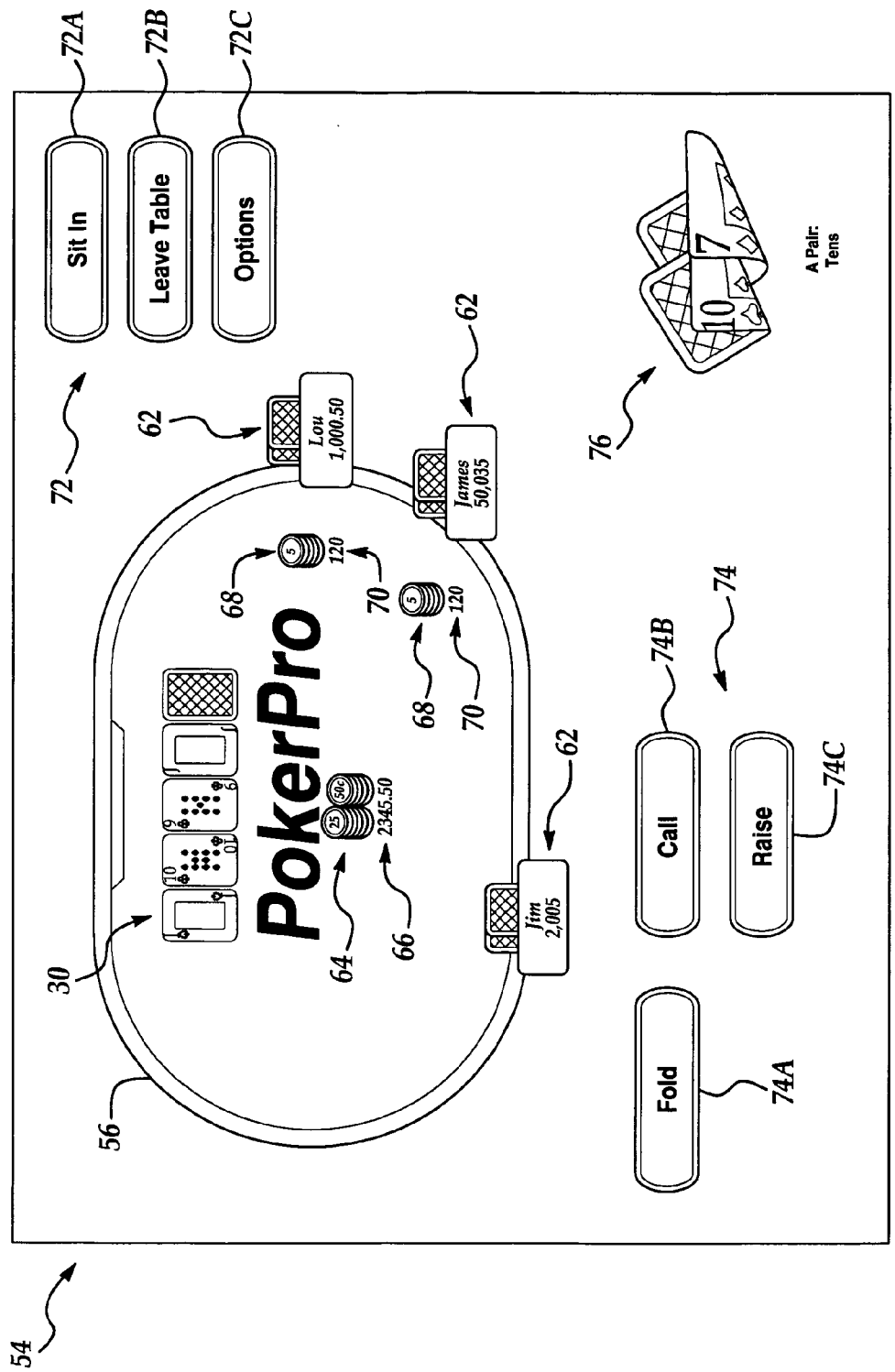
FIG. 10 is a representation of a second screen shot displayed on an electronic player interaction area of the system of FIG. 1, according to an embodiment of the present invention.

With reference to FIGS. 9 and 10, each electronic player interaction area 24 implements a player interface 54. The player interfaces 54 may be implemented on the table top 20 (see above), or in the module 34. In another embodiment, the player interface 54 may be implemented on a hand-held device 58, such as a personal data assistant (PDA).

The player interface 54 may be graphical in nature (as shown in FIGS. 9 and 10), or may take other forms, such as a simple textual format. In one embodiment the electronic player interaction areas 24 provide the player with the option of choosing between several player interfaces 54, such as a graphical representational of an electronic poker table 56 or the text interface.

Returning to FIGS. 9 and 10, in one embodiment the player interface 54 includes a graphical representation of a poker table 56. Each player in the poker game may be represented by a user graphic or icon 62, which may list their names as well as their chip totals. The pot of the current hand may be represented in the center of the poker table 56 by stack(s) of chips 64 and/or a number 66 representing the value of the current pot. Each player's contribution to the pot may be represented by stack(s) of chips 68 and/or a number 70 adjacent their user graphic 62.

The player interface 54 may also includes a series of player option buttons 72 and a series of game buttons 74. The player option buttons 72 may include, for example, a sit in button 72A, a leave table button 72B, and an options button 72C. Generally, only one of the sit in button 72A and the leave table button 72B would be active at any time. The options button 72C allows the player to access an option menu or screen (not shown) which allow the player to modify certain parameters of the player interface 54, such as, for example, to choose between different formats of the player interface 54. The series of game buttons 74 allow the player to signal their game play decisions to the system 10 during the play of the game. The game buttons 74 may include a fold button 74A, a call button 74B and a raise button 74C. These typically would only be active when it is a player's turn in the poker game. In one embodiment, the buttons 72 are implemented on the touch screen display devices 32. In an alternative embodiment, the buttons 72 are embodied in electro-mechanical switches or buttons (not shown).

In one embodiment, the player interface 54 may also include the community cards 30. Other information which may be displayed on the player interface include, but is not limited to indicator of the player whose turn it is, a total of chips for each player, any cards of the other players which are face-up, and/or messages to the player, such as advertising.

Figure 12:
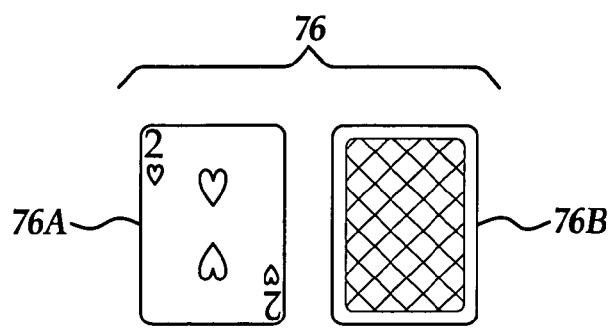
FIG. 12 is a representation of a front side and a back side of an electronic playing card.

In another aspect of the present invention, the player interface 54 includes a graphical representation of one or more of electronic playing cards 76 (see FIG. 12). Each electronic playing card 76 has a front side 76A and a back side 76B. The back side 76B of each card has an identical pattern or image such that the cards cannot be told apart when viewing the back side 76B. The electronic playing card 76 is typically one of a set or deck of standard playing cards. The deck may be a standard deck of 52 cards, each card having a value. The value being two components: the first component being one of a two through ACE and the second component being one of four suits (hearts, diamonds, clubs, spades). The value of each card is indicated on the front side 76A of each playing card 76.

The image displayed on the back side 76B of the playing cards may be a logo, a random image (chosen from a set of predetermined images), or may be advertising directed at the player. The image may include a video. In one embodiment, the image displayed on the back side 76B of the playing cards may be cycled through a set of predetermined images. The image may be selectable by a user, who may be the player or an employee of the casino.

In one embodiment, the electronic playing card or cards 76 are a player's hole card(s) in an electronic poker game. However, the electronic playing 76 cards may be used in any sort of electronic card game in which it is desirable to controllably display/hide the player's cards. Thus, while the present invention may be described below in the context of an electronic poker game (and more specifically, with respect to a player's hole cards in a Hold'em style poker game), the present invention is not limited to such a card game.

In a playing card game with physical cards, in which the player's card are dealt "face-down" and not revealed to any other player, the player may look at their cards, while attempting to keep the cards secret from the other players in several ways. For example, the player may lift the cards close to their bodies, spread them out, and shield them with their hands, so only the player can see the front side of their cards. Or the player may leave the cards face down on the table and lift one side or corner revealing at least a portion of the front side, while shielding the cards with their hands. 100691 A controller, which is either, the module 34, the personal computer 52, the hand-held device 58, the server 50 or a combination thereof, controls the player interface 54, i.e., controls the information components of the player interface 54 displayed on the electronic player interaction areas 24, detects touches on the touch screen display devices 32 (when utilized) and interprets the touches as trigger or touch events (see below). As discussed below, the controller 24, 52, 58, 50 may control the display or obscuring (hiding) of the player's hole electronic playing card(s) such that the player may controllably display and view the cards, while maintaining them secret from the other players. As if the player was playing with physical playing cards, the player, thus, has the opportunity to shield their cards with their hand or hands prior to them being revealed.

A system and method for controllable displaying/obscuring the player's hole electronic playing card(s) is disclosed in U.S. patent application Ser. No. 10/939,772, filed Sep. 13, 2004, which is hereby incorporated by reference.

In one aspect of the present invention, each electronic player interaction area 24 is assigned to a player. Once the player is assigned is to a particular seat at a table 18, the associated EPIA 24 may set as inactive or locked and may indicate the assigned player's name. Once the EPIA 24 is locked, the assigned player must login to the EPIA 24 (see below).

Once the player log-ins, the EPIA 24 becomes active and the player interface 54 is displayed. Also, since the EPIA 24 is active, the player may enter or sit-in on the game being played at the table 12 or adjust/modify any available options by actuating the options button 72C.

In one embodiment as discussed above, the EPIAs 24 may be implemented using a separate or modular computer 34. In one embodiment, the modular computer 34 includes a display 32 which may be a touch-screen display 32. The touch-screen display 32 displays information (text and/or graphics) regarding the play of the game and implements buttons or selectable areas on the EPIA 24 for user input.

A player may log-in to the system 10 or table 18 through the EPIA 24. In one embodiment, the player may log-in to the system 10 using a player tracking card. The player inserts or swipes their player tracking card through the card reader 36. The EPIA 24 may also require entry of a PIN into an attached keypad or keypad implemented on the touch-screen display device 32. Alternatively or in addition, the player may log-in using a biometric parameter, such as a fingerprint, sensed by a sensor and a RFID card or chip.

In one aspect of the present invention, the EPIA 24 includes a sound generation device which is used to generate sounds audible to the player assigned to the EPIA 24. The sound generation device may be implemented as an earpiece or headphones or one or more speakers. Generated sounds may be categorized as system sound or player sounds. System sounds include sounds which are intended or suitable to be heard by everyone, including other players and non-players. Player sounds include sounds which are intended to be heard, but not necessarily only, by the player. Example, system sounds may include sounds imitating the shuffling of cards, the dealing of cards, chips thrown into the pot, sounds related to the winning of the jackpot. Player sounds may include a reminder or indication of a player's turn or if the game is timed, an indication of the time remaining or that time is running out. Player exclusive sounds are sounds that can or should only be heard by the player and may indicate an audible signal indicating the player's hole cards or the highest hand of the player or a winning percentage associated with the player's hand.

In another aspect of the present invention, the EPIAs 24 may be implemented via a touchscreen display device 32. The devices 32 may be integrated with a computer in a module. Alternatively, the touchscreen devices 32 may be separate devices controlled by separate computers or the computer 52 at the table 18 or the server 50.

In many gaming environments 12, such as a poker room at a casino, a portion or percentage of each pot goes to the house for running the poker game. This portion of the pot is known as the rake. In one embodiment, the amount of the rake corresponding to the current pot is displayed on each EPIA 24. The rake may be shown as an amount in dollars and may include a graphical representation of electronic chips.

In one aspect of the present invention, the system 10 utilizes both electronic chips and electronic playing cards. In one embodiment, the EPIA 24 may include a graphical representation of the chips and/or a dollar amount indicative of the amount of chips each player at the table has remaining. Additionally, the EPIA 24 may include a graphical representation of the chips and/or a dollar amount indicative of the amount of the current pot. The pot may be shown in the middle of a graphical representation of the poker table.

In one embodiment, each EPIA 24 may also include a graphical representation of the community cards in the middle of the graphical representation of the poker table. Graphical representations of the other player's card may also be shown (face-down during the current hand and face-up at the end of the hand).

As discussed above, system 10 may require that the player log-ins to the EPIAs 24 which is open or to which they have been assigned. The log-in may be accomplished in a variety of ways (see above). Once a player's identity has been established, however, the player can access a player account, purchase chips using an account balance. Additionally, information regarding the player's play at the table may be tracked and recorded to the player's account.

The EPIAs 24 may be provided with an Ear- or head-phone to provide the sounds (see above) or other signals to the player.

In one aspect of the present invention, the sounds provided by the EPIA 24 (see above), are provided using a simulated voice.

In one aspect of the present invention, the system may utilize a cashless system, such as Ticket-In Ticket-Out or "TITO" (see below)

In one embodiment, the system 10 requires that each player has a player account. The player account may have an associated balance which contains a dollar amount based on an amount of money deposited by the player and/or any winnings that they have collected, either through poker or some other game. Once a player has been identified by the EPIA 24, the player may download a dollar amount and purchase chips to play.

Alternatively, a ticket (with for example a barcode), magnetic card, RFID card, or some other media jointly referred to as a TICKET) may be inserted in the EPIA 24, the table 18, or at a kiosk. The TICKET may have an associated value which is either printed and/or encoded thereon or which is associated with the TICKET in the system 10.

Additionally, once the player decides to leave the table 18, any remaining chips they have, may be instantly converted back into dollars and stored in their player account and/or a new Ticket may be generated.

In another aspect of the present invention, each EPIA 24 may provide an indication of whose turn it is to act. If it is the player's turn who is assigned to an EPIA 24, then the EPIA 24 may provide an appropriate signal, such as an icon, either next to their name or anywhere on the EPIA 24, a sound such as a beep or musical tones, and/or a voice message. If it is another player's turn, the EPIA 24 may indicate whose turn it is by an icon and/or flashing text, e.g., adjacent the player's turn.

As discussed above, the EPIA 24 includes a set of player option buttons 72 which allow the player to take an appropriate action, such as bet, fold, or call, during their turn. In one embodiment, the EPIA 24 only activates those buttons 72 which are appropriate, given the rules of the game being played, during the current turn. For example, if the maximum number of raises for a particular game have already been made, then the wager or raise button would be inactive. Additionally, all of the buttons 72 will be inactive when it is not the player's turn.

As discussed above, each seat or EPIA 24 is assigned to a particular player. The player may be assigned to a seat off an electronic waiting list using a queuing system or may be assigned by an employee of the casino using the system 10. However, under certain situations, the player may desire to change seats or move to another table. For example, if another player or players have left the table leaving fewer players at the table and the player does not like to play at a table with that few of players, the player may request through the EPIA 24 another seat assignment.

The present invention includes methods for displaying and/ or obscuring a player's hole cards (see above). Additionally or separately, the EPIA 24 may be adapted to provide an indication of the winning percentage based on the player's current hand and the community cards. The winning percentage may be shown textually, e.g., 55%, and/or graphically, e.g., a pie-chart or bar chart. The winning percentage may be triggered and shown using the same trigger event associated with the hole cards. Alternatively, a separate trigger event, such as a touch-event on another location on the EPIA 24 may be used to show the winning percentage.

The present invention includes methods for displaying and/ or obscuring a player's hole cards (see above). Additionally or separately, the EPIA 24 may be adapted to provide an indication of the player's current highest hand based on the player's current hand and the community cards. The highest hand may be shown textually, e.g., two-pairs, and/or graphically, pictures of the five cards which make of the highest hand. The highest hand may be triggered and shown using the same trigger event associated with the hole cards. Alternatively, a separate trigger event, such as a touch-event on another location on the EPIA 24 may be used to show the highest hand.

1. Utilizing Surface Acoustic Wave touch screen technology
2. Utilizing Multi Touch touch screen technology
3. Player away feature: Allows a player to press a button to temporarily remove himself from the game. Secure process for returning him to game accounting for missed blinds.
4. User customizable views of the game: Allow many views of the game and method to allow user to select preferred view.
5. Integrated with speakers
6. Method to obscure player pre-selection of one or several bet options: Poker is a sequential game. Situations exist where a player will know what action they want to take prior to it being there turn. Allowing the player to make that decision in advance of their turn in a way that allows players seating close to observe this action would provide an unfair advantage to some players and not others. This feature allows a player to make a pre-selection while observing his hole cards in such a way that other players will not be able to observe that pre-selection.
7. Ability to display live and pre-recorded Video As discussed above, a poker table 18 may include one or more EPIAs 24. For example, each poker table may have 11 seats and accommodate up to 11 players. Each EPIA 24 may have one or more of the features described in IV.

In one embodiment as discussed above, the EPIAs may be implemented using a separate or modular computer 34. In one embodiment, the modular computer 34 includes a display 32 which may be a touch-screen display 32. The touch-screen display 32 displays information (text and/or graphics) regarding the play of the game and implements buttons or selectable areas on the EPIA 24 for user input.

In one aspect of the present invention, the table 18 includes a table sound generation device which is used to generate sounds audible to the players. The table sound generation device may be implemented one or more speakers mounted to integral with the table 18. Alternatively, the table sound generation device may include one or more speakers adjacent to or integral with each EPIA 24. Generally, the sound generation device plays system sounds or player sounds which are suitable for every player to hear.

For example, system sounds may include sounds imitating the shuffling of cards, the dealing of cards, chips thrown into the pot, sounds related to the winning of the jackpot. Player sounds may include a reminder or indication of a player's turn or if the game is timed, an indication of the time remaining or that time is running out. Generally, player exclusive sounds will not be player through the player sound generation device.

In one embodiment of the present invention, the poker table 18 includes a central display area 26. As discussed above, the individual electronic player interaction areas 24 are used to convey game information directly to a player assigned to a specific player interaction area 24 and to implement a player user interface to effectuate interaction or input from the player. The central or common display area 26 is used to display information to all of the players.

The common cards 30 are displayed in the central or common display area 26.

In one embodiment, the central display area 26 is implemented in a separate display 38, such as a LCD or plasma monitor or similar device. The remainder of the table top may be covered in a material such as felt, or more specifically, green, blue, or red felt. Logos, game information, or other information may be printed on the material.

As discussed above, the common cards 30 are displayed in a larger size than the hole cards 28 are displayed at a first predetermined ratio and the common cards 30 are displayed at a second predetermined ratio. The first and second predetermined ratios may be expressed as a ratio of a standard size playing card or a predetermined default size. In one embodiment, the first and second ratios are the same. In another embodiment, the first and second ratios are different. For example, the first and second ratios may be defined such that the common cards 30 are displayed larger than the hole cards 28.

In an alternative embodiment, the electronic player interaction areas 24 and the central display area 26 may be implemented in a single display which covers a large portion of the table top. The electronic player interaction areas 24 and the central display area 26 may be set apart from the rest of the table top 20 by virtual borders. The areas of the display around the electronic player interaction areas 24 and the central display area 26 may be used to simulate the table top of a standard poker table, e.g., an image of material, such as green felt, may be displayed. Furthermore, logos, game information, other information, advertisements, announcements, pictures, videos, or other information may be displayed, rotated, cycled, or displayed for a limited period of time on the table top 20.

Typically displays, such as LCD or Plasma monitors are rectangular in form. As shown in FIGS. 6 and 7, the overlay may be integral with the table top 20 and may include a cut out. The overlay covers the outer edge of the display. Only the portion of the display inside the cut-out is visible. In the illustrated embodiment, the cut out has a shape, such as an oval shape, which is similar to the shape of the table.

As discussed above, the rake is defined as a portion or percentage of each pot that goes to the house for running the poker game. This portion of the pot is known as the rake. In one embodiment, the amount of the rake corresponding to the current pot is displayed on the central display area 26. The rake may be shown as an amount in dollars and may include a graphical representation of electronic chips.

In another aspect of the present invention, the central display area 26 may provide an indication of whose turn it is to act. In one embodiment, the central display area 26 may provide an appropriate signal, such an icon, e.g., an arrow or other symbol, a sound such as a beep or musical tones, and/or a voice message. This indication of a player's turn may be in addition to the indication on the EPIA 24.

During a poker hand, even at a standard poker table with a human dealer, one of the players is designated as the "dealer", for the purposes of the order in which the playing cards are dealt and in which wagers are made. In one aspect of the present invention, the central display area 26 may provide an indication of which player is designated the "dealer" for the current hand. In one embodiment, the central display area 26 may provide an appropriate signal, such as an icon, e.g., an arrow or other symbol. This indication of a player's turn may be in addition to the indication on the EPIA 24.

As discussed above, the hole cards 28 are displayed facedown on the respective electronic player interaction area 24 and the common cards are displayed in the central display area 26. In one aspect, the common cards 30 are displayed at a larger size than the hole card 28.

In one embodiment, the hole cards 28 are displayed at a first predetermined ratio and the common cards 30 are displayed at a second predetermined ratio. The first and second predetermined ratios may be expressed as a ratio of a standard size playing card or a predetermined default size. In one embodiment, the first and second ratios are the same. In another embodiment, the first and second ratios are different. For example, the first and second ratios may be defined such that the common cards 30 are displayed larger than the hole cards 28.

In one aspect of the present invention, the table 18 provides a poker game, such as Texas Hold'em for the players. In one embodiment, the provided poker game is a timed game, i.e., the player's have a predetermined time period in which to complete each turn. For example, the player's have a set period of one minute to complete each turn. Alternatively, the period of time may vary based, e.g., the first turn may have a period of completion of one minute, while the second turn may have a shorter or longer period of completion. Alternatively, each player may have a bank of time. The time used to complete each turn may be deducted from their time bank.

In another aspect of the present invention, the central display 38 may be used to display advertising messages. The advertising messages may be from the casino or third parties and may consist of graphics, pictures, animations, video and/or audio. The advertising may be presented at specific location on the central display 38 and may be varied, based on time, i.e., cycled through a set of advertising messages.

Figure 13B:
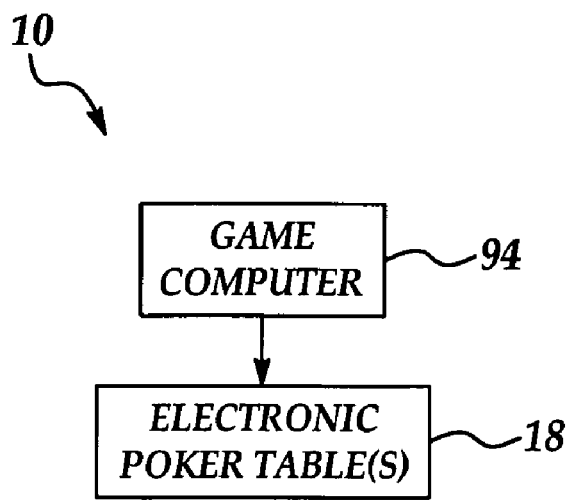
FIG. 13B is a simplified block diagram of a system for providing an electronic poker game, according to an embodiment of the present invention.

With particular reference to FIG. 13B, in one embodiment the game engine 82 is implemented or run on a game computer 94. If the electronic poker table 18 is a stand-alone table 18, then the electronic poker table 18 may include its own game computer 94. Alternatively, the game computer 94 may be the server 50, which may be networked to multiple electronic poker tables 18.

In one embodiment, the game engine 82 includes a random number generator or RNG (not shown). At the beginning of each hand of the electronic poker game, the RNG is used to shuffle a deck of 52 electronic cards and to determine the deck order. One of the players is designated as the dealer.

If the poker table 18 is playing Texas Hold'em, the player on the dealer's left (typically designated by the dealer button) is known as the "Big Blind" and the player on the left of the Big Blind is known as the "Little Blind". At the beginning of the hand, the player known as the Big Blind must post into the pot a predetermined amount, e.g., $1, $5, or $10. This amount is also known as the Big Blind. The player known as the Little Blind must also post into the pot a predetermined amount, typically ½ of the Big Blind. This amount is also known as the Little Blind. Typically, the game engine 82 will automatically deduct the Big Blind and the Little Blind from the respective player's stacks and add them to the pot.

After the blinds have been posted, the game engine 82 will deal two cards, i.e., the players' hole cards, face down to each player. These cards are displayed face down on each player's electronic player interaction area 24. As described above, each player may controllably view their hole cards.

After the hole cards are dealt, the game engine 82 administers a betting round. The first betting round starts with the player on the left of the Little Blind. Generally, each player is given an appropriate set of selections in the form of the game buttons 74. In one embodiment, the game buttons 74 are displayed only during the player's turn. Furthermore, only the game buttons 74 which, according to the rules of the poker game being played, are appropriate are displayed.

After the first betting round, three community cards, i.e., the "flop" are dealt face up by the game engine 82 and displayed. In one embodiment, the community cards are displayed in each electronic player interaction area 24, as shown. If a central display area 26 is used, then the community cards may alternatively or in addition be displayed thereon.

This is followed by a second betting round. After the second betting round, a fourth community card, i.e. the "turn" is dealt by the game engine 82, followed by a third betting round.

After the third betting round, the fifth and final community card, i.e., the "river" is dealt face up. This is followed by the fourth and final betting round. If more than one player remains after the final betting round, the player with the highest hand is determined as the winner of the hand.

If after any of the first through third betting rounds, only one player remains, then the remaining player is automatically determined as the winner. Since one or more of the community cards have not been dealt, the rabbit button 72D on each electronic player interaction area 24 becomes active or is displayed, as described above).

In one aspect of the present invention, the poker tables 18 in the system 10 are networked and connected to one or more servers 50. The server 50 may be used to implement and facilitate, player tracking, ticket in ticket out (cashless) wagering, assigning player's to a seat at a particular table, tournament play, table set-up (including turning the tables on and off and modifying table parameters), and progressive jackpots. Each table 18 may have one or more EPIAs 24. The poker tables 18 and the EPIA may have one or more of the features described below.

In addition, other devices may be connected to the server 50 for providing additional features and/or functions. For example, a queuing system may be provided (see below). This system may be implemented using a separate computer which implements this function. The separate computer may also implement other features or functions of the system. It should be noted, however, that in some systems, these additional features or function could be provided, at least in part, by the server(s) 50.

In one aspect of the present invention, the server 50 runs the games. In other words, the server 50 electronically "shuffles" the playing cards, deals the cards, controls the players' turns, receives the player's inputs and acts accordingly, tracks, manages, and awards the pot, tracks the rake, etc. Game data is stored in a database. Each input, wager, play, etc. is stored in the database.

In one aspect of the present invention, a queueing system assigning player's to seats at a poker table 18 is provided. The queueing system may also implement a waiting list if there are no seats available. In one embodiment, one or more devices, such as a personal, notebook, or tablet computer, handheld computer, or PDA, is accessible by one or more employees of the casino. The device(s) allow the employee(s) to enter a customer's name or player ID or to swipe the player's ID Card. If there is a seat at a table 18 available, the player may be assigned to the seat.

If there is more than one seat available, in one embodiment the employee, may select one of the seats (with or without input from the player). Alternatively, the device may select the seat using a predetermined set of rules.

If there are no seats available, the player is placed in a queue, until a seat opens up. In one embodiment, players are taken off of the queue and assigned a seat on a first come, first served basis. However, the system 10 may allow the casino to implement special rules for players to bypass the queue or list. For example, the casino may present vouchers to players under certain conditions, such as a win in a tournament, to be placed at the head of a queue.

In one aspect of the present invention, the server 50 provides an interface which allows a user, such as an authorized or designated employee of the casino, to set-up a new table 18 or to modify the parameters of an existing table 18. The interface may be implemented on a server 50 or on another device networked to the server 50.

The interface may provide one or more of the following features: ability to turn a table on/off, and ability to change game parameters, such as the permitted wagers, the game being players, the rake, etc.

In one aspect of the present invention, as stated above the system 10 tracks each transaction, wager, card dealt in a database. The system 10 also tracks the players which are playing at each table 10. This information is stored in the database, summarized, and may be presented in any numerous forms of reporting formats. Any information regarding the player's, the games, and how each hand is played may be tracked. This available data may also be analyzed for purposes of determining the frequency of poker hands (per hour) for a table or all games in which a particular player or players played or detecting, e.g., collusion between players.

As discussed above, in one embodiment every player must belong to a player club and have an assigned player ID card to log-in to an EPIA 24 to player poker at a table 18. Each player has an account in the player tracking club. The player's account in the tracking club tracks the amount of cash or money that the player has available for play at poker. The player's account also tracks the player's play at a poker table 18, including amounts wagered and amounts won.

The system 10 allows jackpots, i.e., progressive jackpots, to be generated by and won across multiple hands and/or multiple tables. A progressive jackpot may increase based on the amounts wagered and/or won at the included tables. The progressive jackpot may continue to increase until won under a set of predetermined conditions. Alternatively, it may be active until only for a predetermined time period. The conditions for winning the jackpot that it is won by one or more players at the end of the time period.

The system 10 allows a progressive jackpot to be funded in multiple ways. The way in which a progressive jackpot is funded may be funded through a computer program application on the server 50 or other device. For example, the progressive jackpot may be funded by taking a set percentage from every pot, every other pot, or every $n^{th}$ pot.

The amount of the progressive jackpot maybe displayed on the central display 38 and/or a remote display.

The progressive jackpot may be initiated randomly, under certain defineable conditions, and/or for a specific event, i.e., a marketing event. The progressive jackpot may be a single hand (across mutipled hands), a predetermined number of hands at one table or across multiple hands, for a predetermined time period, etc.

In another aspect of the present invention, after a jackpot is won by a player or the player logs out or any winner exceeds a predetermined amount, or at any other appropriate time, one or more government reporting forms may be presented to the player on their EPIA 24. The form may accept the player's electronic signature (if permissible) or may notify the player of the requirements and direct them to a location where they can fill out the form. The device may be a personal, notebook, or tablet computer, handheld computer, PDA, or other suitable device.

In one aspect of the present invention, one or more employees of the casino may be assigned to manage a plurality of tables. One of the employees may manage the queueing system (where provided). A device, networked to the server, may be provided which provides various functions to the employees. The device provides a dashboard application which allows the employee to manage various aspect of the tables 18

In one aspect of the present invention, the employee may view various data related to the current state of a table, including, but not limited to, the players, the pot, wager information, the common cards, etc.

The employee, for example, in response to an in-person query or a quiry made through an EPIA 24, may view tracked data to look for evidence of collusion between two or more players. For example, the employee may determine if two or more persons at a particular table have a habit of playing at the same time and to determine if there is any pattern discernable in the play which would provide evidence that they are impermissibly working together.

In one aspect of the present invention, each EPIA 24 may provide a player with buttons which summon or direct specific employees of the casino. For example the player may request a host/hostess to order a drink. Additionally, the player may request that an employee review something that occurred or is occurring at the table 18, e.g., possible collusion. This may be done anonymously.

As described above, the device which allows the players to manage the tables 18, may also allow the employee to automatically or manually assign players to particular tables and/or seats and/or EPIA 24.

In one embodiment, the server 50 controls the advertising on the central display 38. Advertising may also be provided on the EPIA's 24 and/or a remote display associated with the poker tables 18. The server 50 may control the content, frequency, and/or the cycling of the advertising.

In one aspect of the present invention, a player may refrain from playing in one or more hands or get up from a table and not play in one or more hands. Typically, however, if the player decides to play a subsequent hand, than the player owes the current pot a predetermined amount, i.e., the "missed blind", per hand missed. In one embodiment, if the player decides to sit-out one or more hands, then the system 10 tracks the number of hands missed and automatically deducts an amount equal to the number of hands missed multiplied by the blind once the player decides to play another hand.

As discussed above, the system 10 records every transaction, card dealt or played, wager, etc. in a database. This allows the system 10 to recover from any error and put the game back into the same state.

The system 10 facilitates tournament play. In a tournament, a predetermined number of tables 18 having a predetermined number of players are involved. A buy-in, e.g., $100 is required. Typically, after a player loses all of their money, they are eliminated from the tournament.

Under predetermined rules, players may register for a tournament and be assigned to seats at a table. During play, under predetermined rules, tables may be broken down and the players distributed to other tables. The system 10 facilitates the tournament by providing one or more of the following features:
a) Registration
b) Tracking tournament information
c) display of tournament information on central display and/or remote display
d) tournament set-up, e.g., buy-in
e) Re buy-in
f) tournament jackpot, cash or entry voucher for entry another tournament (specific tournament or expiration date)
g) Process for breaking tables
 (1) message that table is breaking
 (2) convey new seat assignment
 (3) determination of breaking order
 (4) display of breaking order
h) display information on status of other tables and players at other tables
i) System to monitor and adjust hands per hour of an individual table during a tournament: During a poker tournament it is important that each table play roughly the same number of hands per hour as all other tables. This can be accomplished by pausing a game and/or slowing a game down with out pausing.
j) Multi-site tournaments.
k) System for automatically paying players tournament winnings based on tournament pay tables and their final position in the tournament.

In one aspect of the present invention, remote or virtual games may be provided by the system 10. The remote or virtual games may be provided on wireless devices and may be played at predetermined locations.

Virtual games may also be provided through the EPIAs 24. For example, the virtual or remote games may be played by the poker players when it is not their turn. The virtual or remote games may be another poker hand, played against other players, at the table or at other tables, or played against virtual players. Alternatively, the remote or virtual games may be other types of games, including, but not limited to blackjack, keno, slot machines, etc.

In addition to running other casino games on the EPIAs 24 or other terminals, the system 10 can be run on other gaming devices throughout the casino. For example, a virtual poker game can be run on an existing electronic bingo terminal or an electronic race book terminal.

Typically, as the prior art poker game begins, two blinds, such as Small Blind and Big Blind, are placed in the pot by the two players to the immediate left of the dealer. The blinds are put in to start the action. Everyone is dealt two down cards ("hole cards"). The action begins with the player to the left of the Big Blind folding, calling, or raising. Action continues with all players making one of these decisions. This is the first betting round. As appreciated by those skilled in the art, upon completion of the first round of betting, the dealer then turns over three cards (community cards known as "The Flop"). This is the second betting round. Beginning with this round of betting (and throughout the remainder of the hand), the player to the left of the button acts first. The player may now check (not bet or fold) or bet if there is no betting in front of them. If there is betting and/or raising in front of them, they may Call, Raise, or Fold. Following the completion of action on the "flop", the dealer turns over another card (known as "The Turn" or "Fourth Street"). This is the third round of betting. The betting again starts with the player closest to the left of the button. Following the completion of action on "the turn", the dealer turns over the last card (known as "The River" card or "Fifth Street"). This is the final round of betting. Upon completion of the final round of betting, the best hand wins the pot.

Figure 14A:
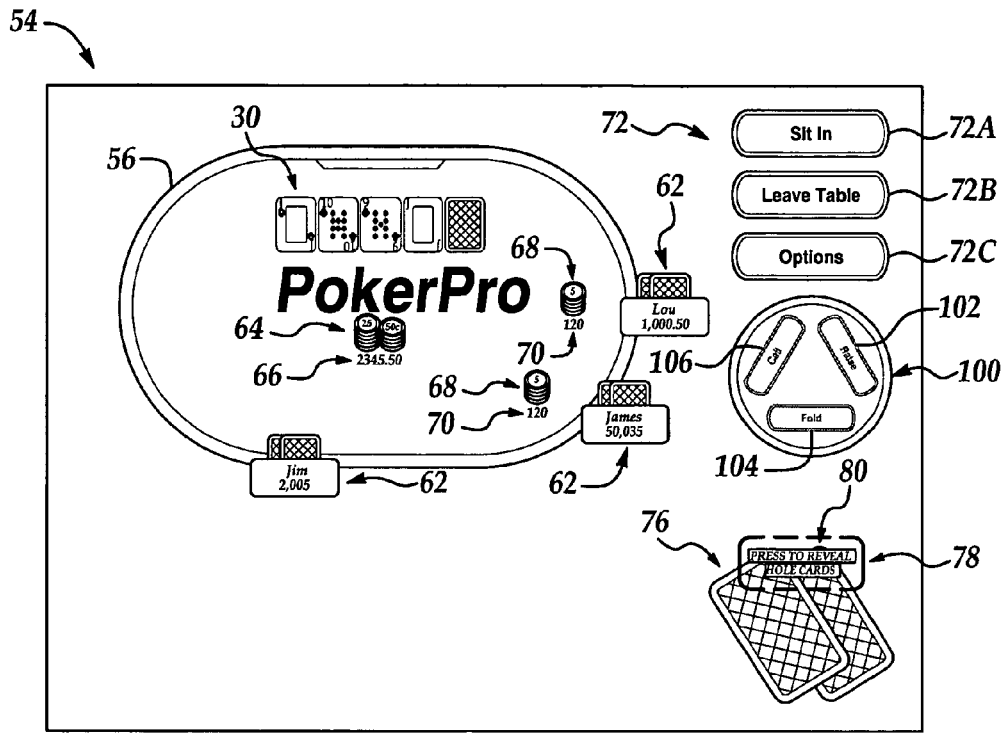
FIG. 14A is a representation of a third screen shot displayed on the electronic player interaction area of the system of FIG. 10, according to an embodiment of the present invention with a wager action section having wager action buttons defined in the electronic player interaction area with the wager action buttons illustrated as dimmed.
Figure 14B:
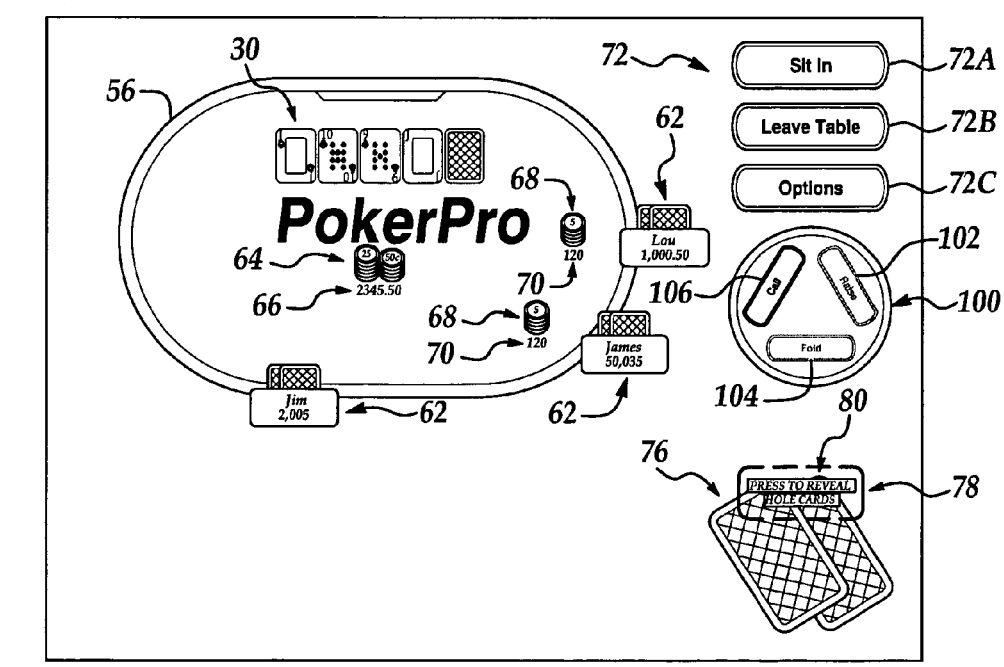
FIG. 14B is a representation of a fourth screen shot displayed on the electronic player interaction area of the system of FIG. 14A with at least one of the wager action buttons illustrated as activated or highlighted.
Figure 14C:
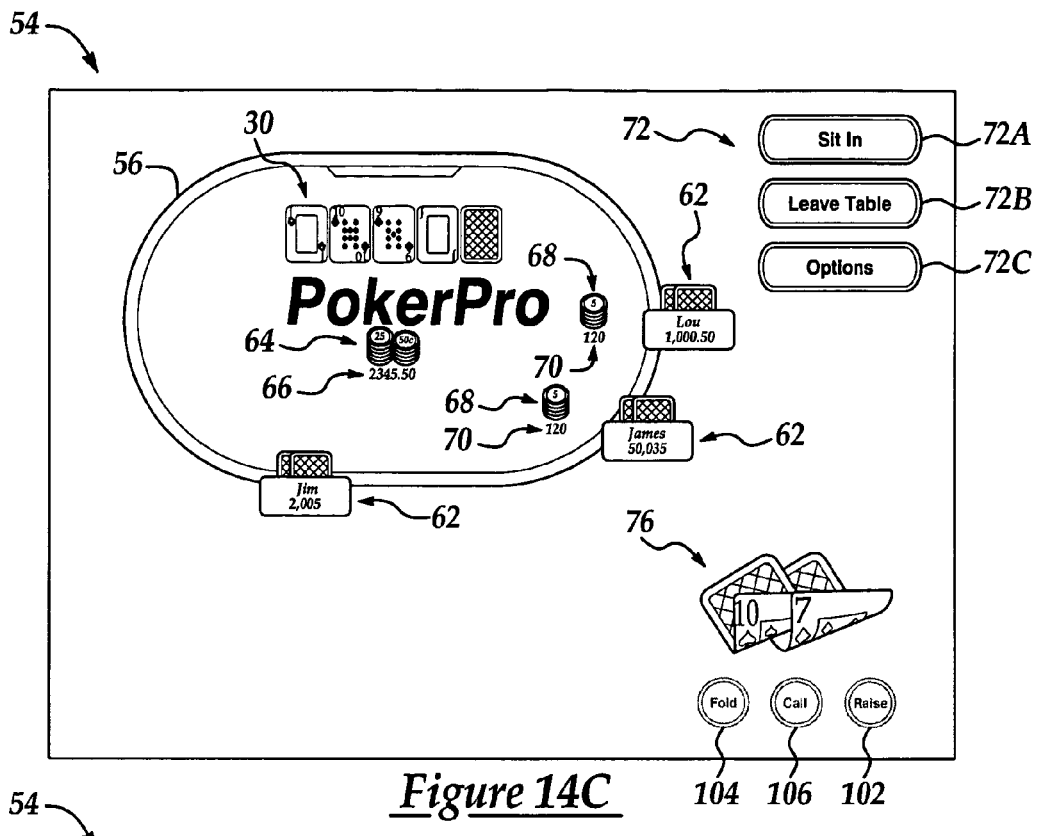
FIG. 14C is a representation of a fifth screen shot displayed on the electronic player interaction area of the system of FIG. 14A illustrating alternative embodiment of the present wager action section having wager action buttons defined in the electronic player interaction area with the wager action buttons illustrated as dimmed.
Figure 14D:
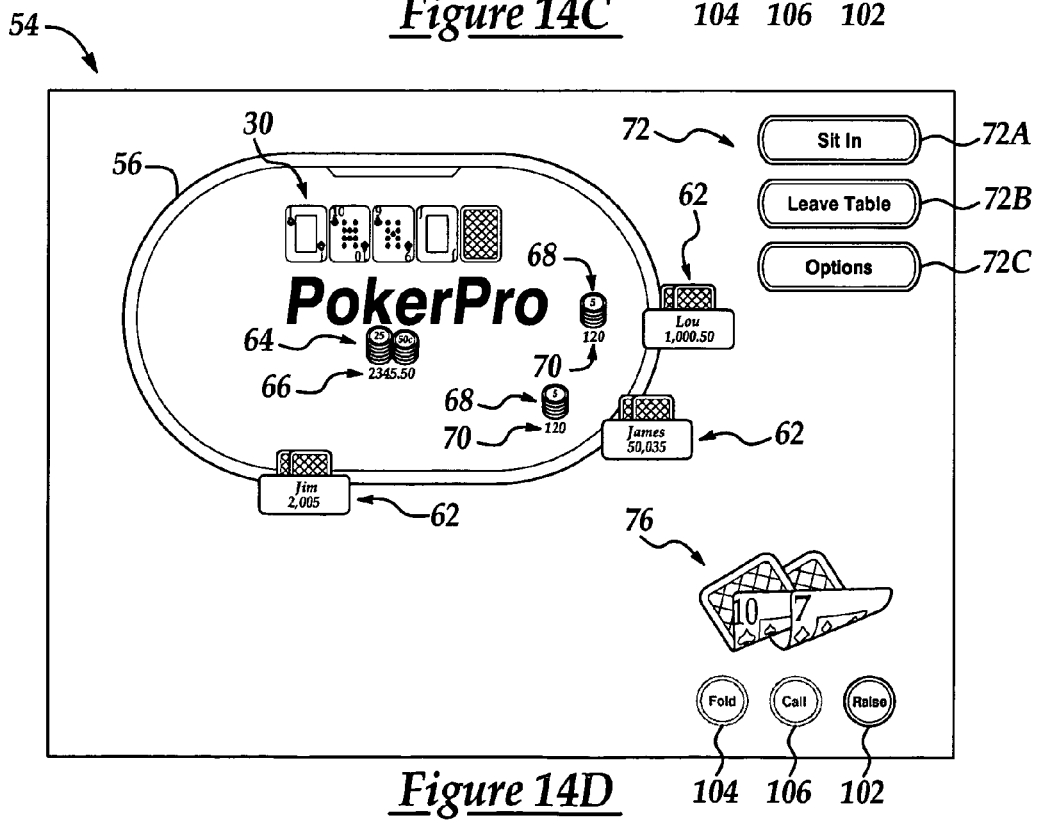
FIG. 14D is a representation of a sixth screen shot displayed on the electronic player interaction area of the system of FIG. 14C with at least one of the wager action buttons illustrated as activated or highlighted.

Alluding to the above and as illustrated in FIGS. 14A through 14D the server or game computer 50 is coupled to the plurality of EPIAs 24 A through J for assigning one of the players to the new seat or EPIA 24. As shown in FIGS. 14A and 14B, each EPIA 24 presents a wagering action section generally indicated at 100. A series of player game buttons, such as "Raise" button 102, "Fold" button 104, and "Call" button 106 are defined in the wagering action section 100. The series of game buttons 102 through 106 allow the player to signal their game play decisions to the system 10 during the play of the electronic poker game. These typically would only be active when it is a player's turn in the electronic poker game, as known to those skilled in the art. In one embodiment, the buttons 102 through 106 are implemented on the touch screen display devices 32, as shown in FIGS. 14A and 14B. In an alternative embodiment, as shown in FIGS. 14C and 14D, the buttons 102 through 106 are shown under the player's cards 76 as the cards 76 are dealt partially "face-up" and not revealed to any other player, as the player look at their cards and decides his next wagering action, while attempting to keep the cards and the next wagering action away from the other players.

In one embodiment, the game buttons 102 through 106 may permanently appear on the EPIA 24. Alternatively, the game buttons 102 through 106 may appear on the EPIA 24 as the player taps or toggles the EPIA 24 in a designated location. The game buttons 102 through 106 are shown to the player in at least two operational modes. In the first operational mode, the game buttons 102 through 106 are dimmed, as illustrated in FIG. 14A. In second operational mode, when activated, i.e. tapped or toggled by the player, who elects to pre-select the next wagering action, the game button 106 is highlighted, as illustrated in FIG. 14B. Then, the game buttons 102 through 106 disappear from the EPIA 24 and reappears in the players' EPIA 24 in highlighted mode to put the player on notice that the player had pre-selected the game button 106, as shown in FIG. 14B, and, unless the player had changed his/her mind with respect to the wagering action, the game computer 50 will proceed with the pre-selected game button 106, such as, for example "Call" button. If, for example, the player chooses not to proceed with the pre-selected wagering action, the player may select the wagering action other that one previously selected. Alternatively, the game buttons 102 through 106 may permanently appear on the touch screen display devices 32 being dimmed when not activated and being highlighted when activated.

The game computer 50 coupled to each EPIA 24 to control the game process, holds in a system the aforementioned pre-selected wagering action and responds to the pre-selected wagering action by the player when the player's turn comes. When the player taps the "Call" button 106, a signal is sent to the game computer 50. When the current player calls, it means that at least one prior player made a bet or raise and that the current player wants to meet such pending bet or raise amount. The game computer 50 then deducts the call amount from the current player's account. Alternatively, the game computer 50 may also send a signal to the CDA 26 to display the new amount of the main pot and all side pots, as known to those skilled in the art. The game computer 50 then sends a signal to the EPIA 24 of the next player to enable or activate the EPIA of the next player for allowing the next player to proceed with the pre-selected wagering action or for allowing the next player to select the wagering action other that one previously pre-selected.

When the player presses the "Raise" button 102, a signal is sent to the game computer 50. When the player raises, it means that at least one prior player made a bet. Those skilled in the art will appreciate, that it may also mean that at least one prior player made a raise. The game computer 50 deducts the raise amount from the current player's account. The game computer 50 then sends a signal to the EPIA 24 of the next player to enable or activate the EPIA of the next player for allowing the next player to proceed with the pre-selected wagering action or for allowing the next player to select the wagering action other that one previously pre-selected.

Alluding to the above, when the player presses "Fold" button 104, a signal is sent to the game computer 50. When the current player folds, it means that at least one prior player made a bet or a raise, and that the current player does not want to meet the bet or raise. The current player discards his two down or hole cards to the dealer. The game computer 50 maintains the player's stored stack amount intact. The game computer 50 then sends a signal to the EPIA 24 of the next player to enable or activate the EPIA of the next player for allowing the next player to proceed with the pre-selected wagering action or for allowing the next player to select the wagering action other that one previously pre-selected.

Figure 15:
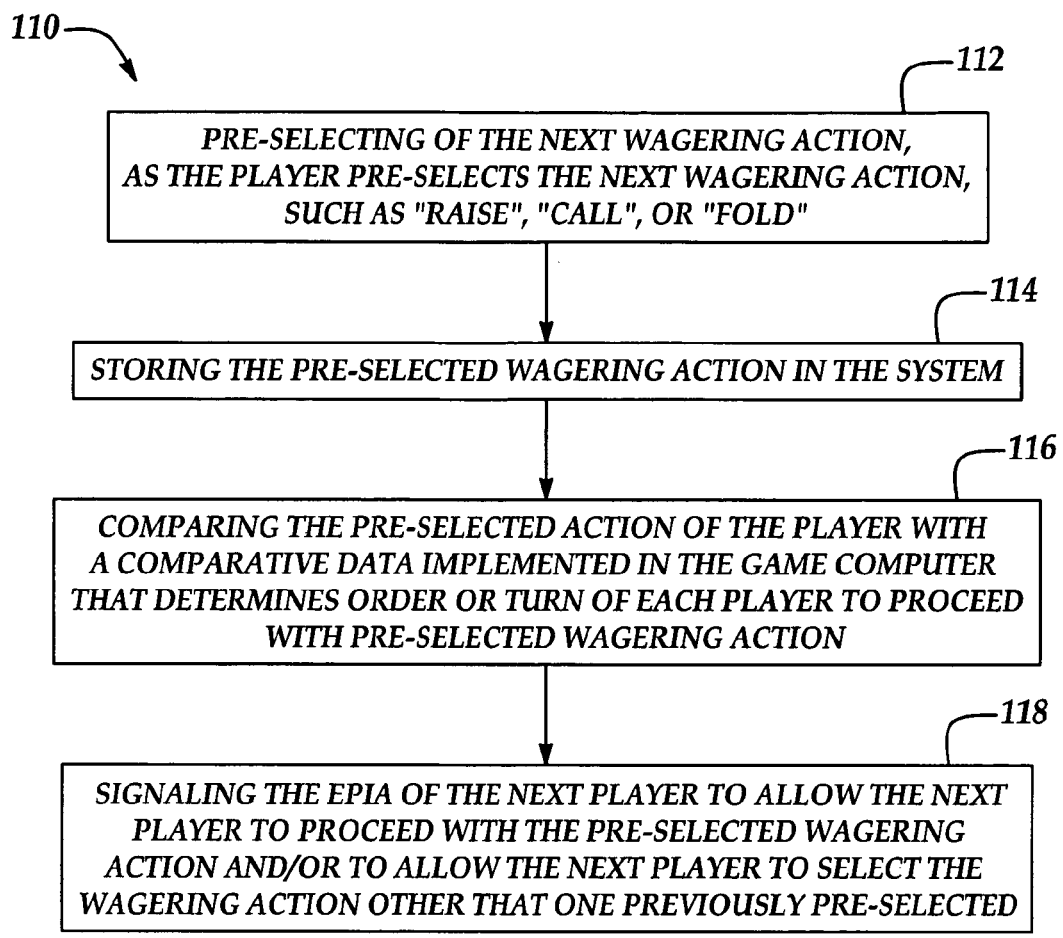
FIG. 15 is a simplified block diagram of a system for providing an electronic poker game, according to an embodiment of the present invention.

The present invention includes a method of playing the electronic poker game generally shown at 110 in FIG. 15. The method includes the steps of providing the electronic poker table 18 having the table top 22 with the playing surface 22 and providing a plurality of the EPIAs 24 by locating them around the periphery of the table top 20 to provide the player interface for interaction with one of the players. A fresh table of the electronic poker game starts of with the first player sitting on the table 18 with the game computer 50 indicating this first player as the dealer and the next player posting the small blind. Since each player has the wagering options available to each player depending on the action taken by the previous player, as previously alluded, the first player (left of the Big Blind) to act (in the first round) would get the "Bet", "Call" and "Raise" options. Subsequent players would also get the options of "Call" and "Raise". The rules of the electronic poker game are known to those skilled in the art and will not be described in greater detail. The next step of the method 110 includes pre-selecting 112 of the next wagering action, as the player pre-selects the next wagering action, such as "Raise", "Call", or "Fold" by tapping of the buttons 102 through 106. As the player taps the "Raise" button 102, for example, the EPIA 24 signals the game computer 50 the wagering action pre-selected and the game computer 50 stores 114 in the system that pre-selected by the player action. The next step of the method 110 includes comparing 116 the pre-selected action of the player with a comparative data implemented in the game computer that determines order or turn of each player to "Call", "Raise" or "Fold" relative to the hand of the betting round. If the player is allowed to proceed with the pre-selected wagering action, such as for example "Fold", the game computer signals 118 the EPIA 24 of the next player to allow the next player to proceed with the pre-selected wagering action or to allow the next player to select the wagering action other that one previously pre-selected.

Obviously, many modifications and variations of the present invention are possible in light of the above teachings. The invention may be practiced otherwise than as specifically described within the scope of the appended claims.

The invention claimed is:

1. An electronic card table for providing an electronic card game to a plurality of players, comprising:
   a table having a table top with a playing surface;
   a plurality of electronic player interaction areas located around a periphery of the table top, the plurality of electronic player interaction areas being configured to be used by a plurality of players,
   a wagering interface provided by each electronic player interaction area, the wagering interface being configured to allow the player to send an initial wagering action from the electronic player interaction area at a time that is during a hand of the electronic card game and prior to the player's turn to make a wagering action in a betting round of the hand of the electronic card game, and
   a network including a game computer coupled to the plurality of electronic player interaction areas, the game computer being configured to administer at least the betting round of the hand of the electronic card game, comprising the game computer being configured to determine when the player's turn to make a wagering action in the betting round occurs, wherein during the betting round of the hand of the electronic card game the game computer responds to the initial wagering action sent by the player by storing the initial wagering action in the game computer and thereby allowing the player to proceed with the initial wagering action, and allowing the player to select a wagering action other than the initial wagering action at a time that is during the player's turn to make a wagering action in the betting round of the hand of the electronic card game and after the time that is prior to the player's turn to make a wagering action in the betting round of the hand of the electronic card game, and the game computer is operative so that at the player's turn to make a wagering action in the betting round, the betting round proceeds, on behalf of the player, with the initial wagering action, rather than the wagering action other than the initial wagering action, if the player selects the initial wagering action prior to the player's turn to make a wagering action in the betting round and thereafter the player takes no further action upon the electronic card table until after completion of the player's turn to make a wagering action in the betting round, wherein the player taking no further action upon the electronic card table until after completion of the player's turn to make a wagering action in the betting round comprises the player not selecting the wagering action other than the initial wagering action before completion of the player's turn to make a wagering action in the betting round, and the betting round proceeds, on behalf of the player, with the wagering action other than the initial wagering action, rather than the initial wagering action, if the player selects the wagering action other than the initial wagering action before completion of the player's turn to make a wagering action in the betting round, wherein the completion of the player's turn to make a wagering action in the betting round occurs at least by completion of the hand of the electronic card game.

2. An electronic card table, as set forth in claim 1, including a wager selection area defined in each electronic player interaction area being visible to the player as the player activates the wager selection area thereby allowing the player to make the initial wagering action.

3. An electronic card table, as set forth in claim 2, including at least one game button defined in the wager selection area being visible to the player, the wager selection area being configured to allow the player to activate the at least one game button thereby signaling a game play decision to the game computer.

4. An electronic card table, as set forth in claim 3, wherein the at least one game button comprises three game buttons.

5. An electronic card table, as set forth in claim 4, wherein the at least one game button is dimmed when the at least one game button appears in a non-activated mode.

6. An electronic card table, as set forth in claim 4, wherein the at least one game button is highlighted when the at least one game button appears in an activated mode.

7. An electronic card table, as set forth in claim 4, wherein the three game buttons comprise a fold button, a call button, and a raise button.

8. An electronic card table, as set forth in claim 1, wherein the game computer animates at least one electronic playing card by displaying an animation sequence designed such that a corner of the playing card appears to bend in an upward direction revealing the at least a portion of the front side of the playing card.

9. An electronic card table, as set forth in claim 8, wherein three game buttons are implemented below the at least one electronic playing card as the corner of the playing card appears to bend in an upward direction revealing the at least a portion of the front side of the electronic playing card.

10. An electronic card table, as set forth in claim 9, wherein the game computer animates the electronic playing card by displaying an animation sequence designed such that the at least the portion of the front side of the playing card is displayed in a wiping motion.

11. An electronic card table, as set forth in claim 10, wherein the game computer in administering the electronic card game administers at least two of the betting rounds.

12. An electronic card table, as set forth in claim 11, wherein the electronic player interaction areas are touch-screen displays.

\* \* \* \* \*